(12) United States Patent
LaHousse et al.

(10) Patent No.: US 12,503,083 B2
(45) Date of Patent: Dec. 23, 2025

(54) MULTISTAGE LANDING GEAR ACTUATOR

(71) Applicant: Alkon Corporation, Fremont, OH (US)

(72) Inventors: Shane R. LaHousse, Ann Arbor, MI (US); Christopher Domanski, Brighton, MI (US); Robert L. Allen, Linden, MI (US)

(73) Assignee: Alkon Corporation, Fremont, OH (US)

( * ) Notice: Subject to any disclaimer, the term of this patent is extended or adjusted under 35 U.S.C. 154(b) by 358 days.

(21) Appl. No.: 17/904,539

(22) PCT Filed: Feb. 21, 2020

(86) PCT No.: PCT/US2020/019297
§ 371 (c)(1),
(2) Date: Aug. 18, 2022

(87) PCT Pub. No.: WO2021/167622
PCT Pub. Date: Aug. 26, 2021

(65) Prior Publication Data
US 2023/0091572 A1    Mar. 23, 2023

(51) Int. Cl.
*B60S 9/04* (2006.01)
*B60S 9/08* (2006.01)
*F16H 9/04* (2006.01)
*F16H 19/06* (2006.01)
(Continued)

(52) U.S. Cl.
CPC . *B60S 9/04* (2013.01); *B60S 9/08* (2013.01); *F16H 9/04* (2013.01); *F16H 19/06* (2013.01); *F16H 63/3023* (2013.01); *F16H 2063/3053* (2013.01); *F16H 2063/3093* (2013.01); *F16H 63/32* (2013.01)

(58) Field of Classification Search
CPC ...... B60S 9/04; B60S 9/08; F16H 9/04; F16H 19/06; F16H 63/3023; F16H 63/32; F16H 2063/3053; F16H 2063/3093
See application file for complete search history.

(56) References Cited

U.S. PATENT DOCUMENTS

| 4,116,315 A | 9/1978 | Vandenberg |
| 6,230,577 B1 * | 5/2001 | Showalter ............. F16H 63/304 74/421 A |

(Continued)

FOREIGN PATENT DOCUMENTS

| DE | 212019000176 U1 * | 8/2020 | ............. F16D 11/14 |
| JP | 6380272 B2 * | 8/2018 | |

OTHER PUBLICATIONS

JP-6380272-B2 English Translation (Year: 2018).*
DE-212019000176-U1 English Translation (Year: 2020).*
The International Search Report and the Written Opinion of the International Searching Authority, International Application No. PCT/US2020/019297, dated Apr. 30, 2020, pp. 1-15.
(Continued)

*Primary Examiner* — Michael T. Walsh
(74) *Attorney, Agent, or Firm* — Bond, Schoeneck & King, PLLC

(57) ABSTRACT

A landing gear system including a landing gear actuator assembly arranged to selectably provide an increased torque output to a cross-shaft adaptor rotationally coupled to a cross-shaft of a trailer landing gear assembly. A rotational engagement mechanism is arranged to, in response to a remote signal, shift a rotational engagement mechanism to selectably couple the cross-shaft adaptor with a light gear set or selectably couple the cross-shaft adaptor with a heavy gear set.

13 Claims, 19 Drawing Sheets

(51) Int. Cl.
   *F16H 63/30*      (2006.01)
   *F16H 63/32*      (2006.01)

(56) References Cited

U.S. PATENT DOCUMENTS

| | | | | |
|---|---|---|---|---|
| 9,043,103 | B2* | 5/2015 | Mori | F16H 63/304 |
| | | | | 477/109 |
| 9,598,057 | B2 | 3/2017 | Oestreich et al. | |
| 9,797,478 | B2 | 10/2017 | Wu | |
| 9,873,410 | B2 | 1/2018 | Laarman et al. | |
| 2001/0054815 | A1 | 12/2001 | Baird et al. | |
| 2003/0168648 | A1 | 9/2003 | Alguera Gallego et al. | |
| 2008/0315570 | A1 | 12/2008 | Baxter et al. | |
| 2014/0077140 | A1 | 3/2014 | Baird | |
| 2014/0157917 | A1* | 6/2014 | Oestreich | B60S 9/08 |
| | | | | 74/89.13 |
| 2015/0224838 | A1 | 8/2015 | Laarman et al. | |
| 2015/0300455 | A1 | 10/2015 | Wu | |
| 2017/0368925 | A1* | 12/2017 | Maki | B60K 6/48 |
| 2024/0328465 | A1* | 10/2024 | Houser | F16H 63/30 |

OTHER PUBLICATIONS

The International Search Report and the Written Opinion of the International Searching Authority, International Application No. PCT/US2020/064822, dated Mar. 10, 2021, pp. 1-12.

Office Action, Canadian Patent Application No. 3,168,759, dated Oct. 25, 2023, pp. 1-5.

Office Action, Canadian Patent Application No. 3,168,703, dated Oct. 25, 2023, pp. 1-5.

Office Action, Canadian Patent Application No. 3,168,703, dated Nov. 18, 2024, pp. 1-6.

International Preliminary Report on Patentability, International Patent Application No. PCT/US2020/019297, dated Aug. 23, 2022, pp. 1-7.

International Preliminary Report on Patentability, International Patent Application No. PCT/US2020/064822, dated Aug. 23, 2022, pp. 1-6.

Non-Final Office Action, U.S. Appl. No. 17/904,542, dated Dec. 20, 2024, pp. 1-12.

* cited by examiner

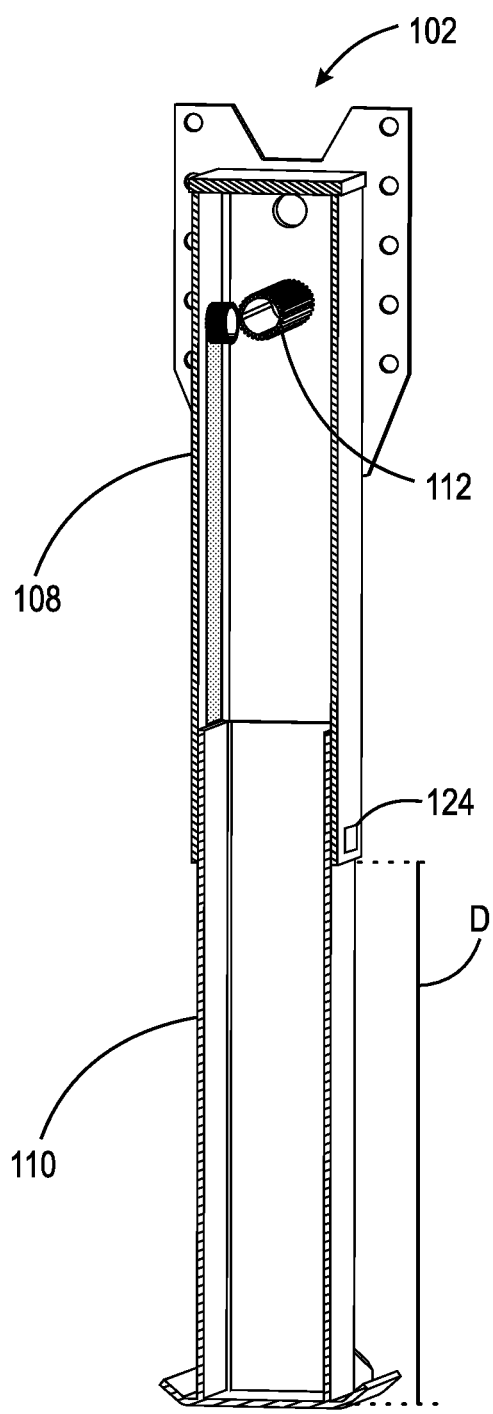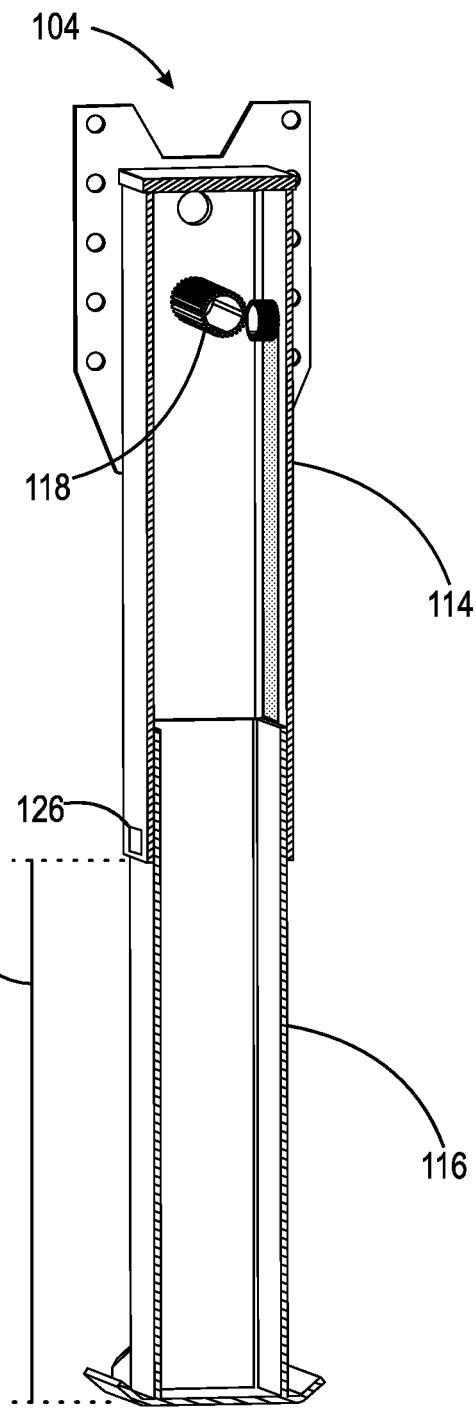
Fig. 2A                    Fig. 2B

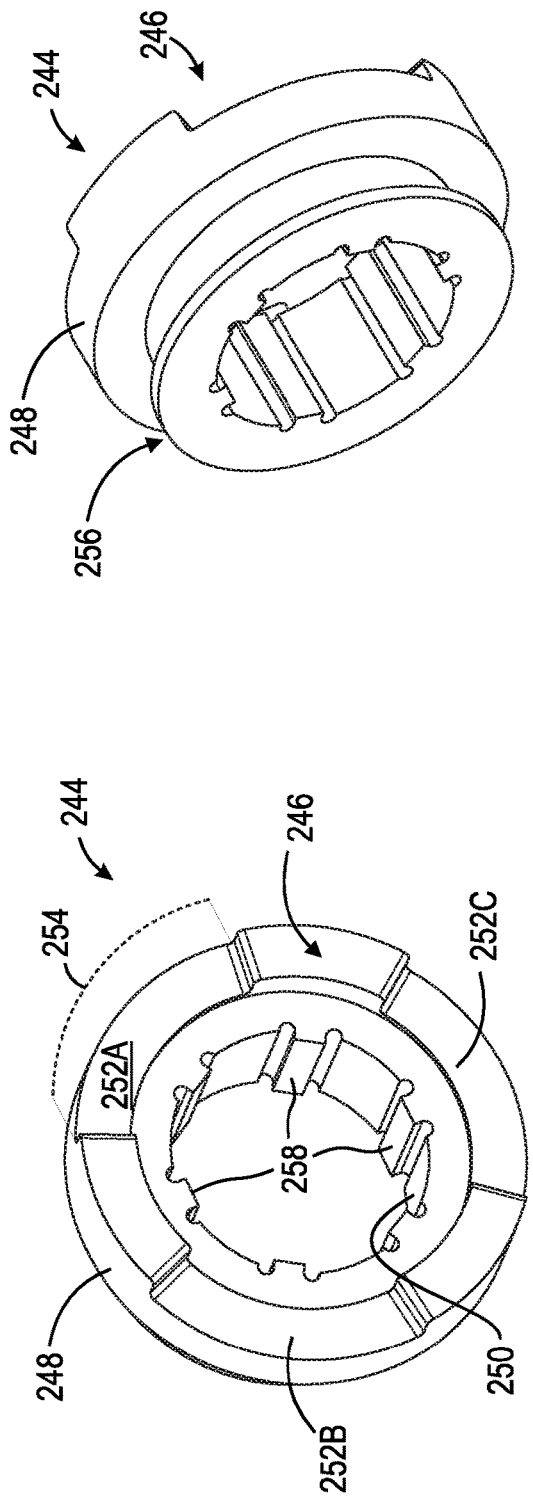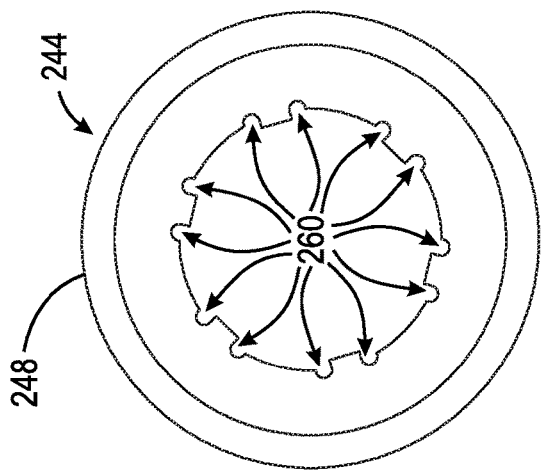
Fig. 9A Fig. 9B Fig. 9C

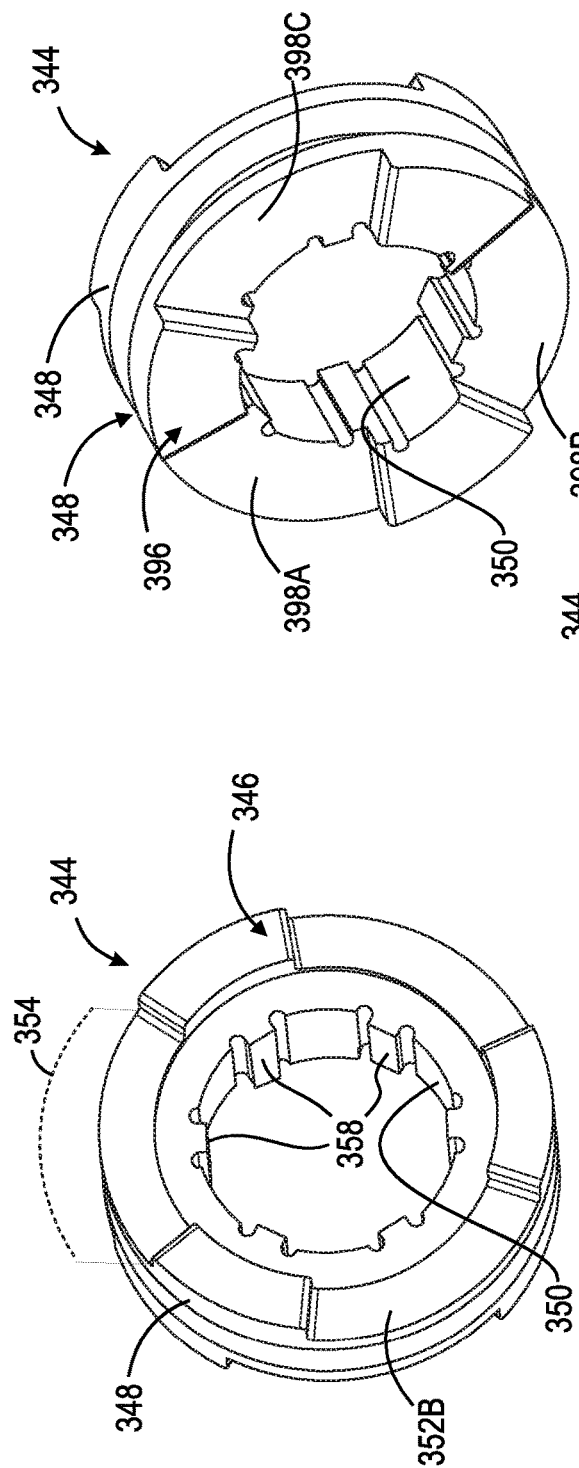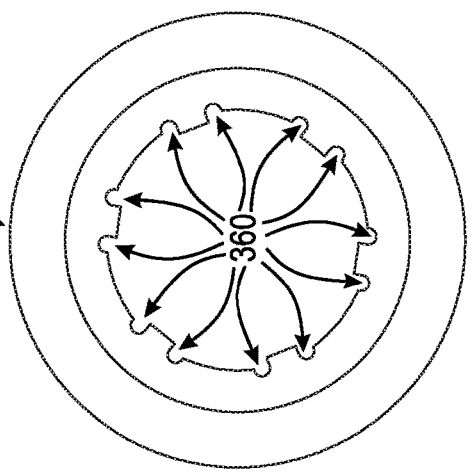

MULTISTAGE LANDING GEAR ACTUATOR

CROSS-REFERENCE TO RELATED APPLICATIONS

This application is a National Stage Application, filed under 35 U.S.C. § 371, of International Patent Application No. PCT/US2020/019297, filed Feb. 21, 2020, the disclosure of which is herein incorporated by reference in its entirety.

FIELD OF THE DISCLOSURE

The present disclosure is directed generally to landing gear assemblies, specifically to a landing gear actuator assembly for trailers.

BACKGROUND

Trailers for transporting goods are configured to be removably connectable with a tractor, which typically includes a power source, e.g., a gas-powered engine, which propels the combined tractor-trailer to its destination. The tractor and the trailer typically include a component or components for creating a releasable connection between the tractor and the trailer. A trailer can also include one or more pairs of rear wheels, where each pair of rear wheels is non-rotatably connected via an axle. Notably, the trailer may include retractable or telescoping landing gear, which can be positioned at the front of the trailer proximate the component or components which establish the releasable connection with the tractor. When a tractor-trailer is transporting goods the axles of the tractor and the connection with the tractor keep the trailer level and stable and the landing gear is retracted. However, once the tractor-trailer reaches its destination and the operator of the tractor disconnects the tractor from the trailer, the landing gear is expanded and, while in the expanded state, is used to keep the trailer substantially level.

Generally, landing gear systems are manually operated, i.e., actuated between the retracted state and the expanded state, via a manual hand crank. The process of operating the landing gear system takes time and effort from the operator. Furthermore, manual operation of landing gear systems from the retracted state to the expanded state via a manual hand crank may place the operator of the tractor at risk of injury.

SUMMARY OF THE DISCLOSURE

The present disclosure is related to actuators for landing gear systems for trailers. Specifically, the landing gear actuator assemblies discussed herein are arranged to selectably provide an increased torque output to a cross-shaft adaptor rotationally coupled to a cross-shaft of a trailer landing gear assembly. A rotational engagement mechanism is arranged to, in response to a remote signal provided by the operator of the trailer landing gear assembly, shift such that the rotational engagement mechanism can selectably couple the cross-shaft adaptor with a light gear set (in a one-speed arrangement) or selectably couple the cross-shaft adaptor with a light gear set or a heavy gear set (in a two-speed arrangement) as will be described below.

In one example, a landing gear actuator assembly is provided, the landing gear actuator assembly including an input shaft arranged to receive rotational motion generated by a motor, a cross-shaft adaptor arranged to couple the landing gear actuator assembly to a cross-shaft of a trailer landing gear assembly, a light gear set associated with a first torque output of the landing gear actuator assembly, a heavy gear set associated with a second torque output of the landing gear actuator assembly, the second torque output greater than the first torque output; and, a rotational engagement mechanism arranged to selectably couple the rotational motion of the input shaft to the light gear set and selectably couple the rotational motion of the input shaft to the heavy gear set to rotate the cross-shaft adaptor using the light gear set or the heavy gear set.

In one aspect, the rotational engagement mechanism is a clutch plate having a first side face and a second side face, where the first side face is arranged to engage with the light gear set and the second side face is arranged to engage with the heavy gear set.

In one aspect, the first side face of the clutch plate further includes a first plurality of recesses annularly spaced about and positioned adjacent to a circumferential surface of the clutch plate.

In one aspect, the light gear set includes a light gear wheel, the light gear wheel comprising a first side face, the first side face including a first plurality of protrusions arranged to selectably engage with respective recesses of the first plurality of recesses of the first side face of the clutch plate.

In one aspect, each recess of the first plurality of recesses includes a first arc length along the circumferential surface of the clutch plate, and each protrusion of the first plurality of protrusions of the first side face of the light gear wheel includes a second arc length, where the second arc length is less than the first arc length.

In one aspect, the second side face of the clutch plate comprises a second plurality of recesses annularly spaced about and positioned adjacent to a circumferential surface of the clutch plate.

In one aspect, the heavy gear set includes a heavy gear wheel, the heavy gear wheel comprising a first side face, the first side face of the heavy gear wheel comprising a second plurality of protrusions arranged to selectably engage with respective recesses of the second plurality of recesses of the second side face of the clutch plate.

In one aspect, the rotational engagement mechanism is arranged to translate between a first position, a second position, and a third position, wherein the first position is associated with a transfer of the first torque output from the light gear set to the rotational engagement mechanism, the second position is associated with a neutral mode, and the third position is associated with a transfer of the second torque output from the heavy gear set to the rotational engagement mechanism.

In one aspect, the rotational engagement mechanism is connected to an actuator, wherein the actuator is a pneumatic actuator, an electric actuator, or a hydraulic actuator.

In one aspect, the rotational engagement mechanism is connected to the actuator via a shift fork.

In one aspect, the rotational engagement mechanism further includes a circumferential surface comprising an annular recess, the annular recess arranged to receive the shift fork.

In one aspect, the shift fork is arranged to slidingly translate along a support shaft arranged parallel to an imaginary axis, the imaginary axis arranged orthogonal to a first side face of a first light gear wheel of the light gear set.

In one aspect, the landing gear actuator assembly further includes a first gear stage arranged to increase an initial motor torque of the motor, where the first gear stage is connected to the light gear set and connected to the heavy gear set.

In one aspect, the light gear set includes a light gear wheel having a first width and wherein the first gear stage comprises a first gear wheel having a second width, where the first width is greater than the second width.

In one aspect, the light gear set includes a first light gear wheel and a second light gear wheel rotationally coupled via a belt, chain, or gear teeth arrangement.

In one aspect, the rotational engagement mechanism has an inner circumferential surface, the inner circumferential surface including a plurality of splines arranged to non-rotatably engage with the cross-shaft adaptor.

In another example, a landing gear system is provided, the landing gear system including a first landing gear leg rotationally engaged with a cross-shaft of a trailer landing gear assembly; and a landing gear actuator assembly. The landing gear actuator assembly includes an input shaft arranged to receive rotational motion generated by a motor, a cross-shaft adaptor arranged to couple the landing gear actuator assembly to a cross-shaft of a trailer landing gear assembly, a light gear set associated with a first torque output of the landing gear actuator assembly, a heavy gear set associated with a second torque output of the landing gear actuator assembly, the second torque output greater than the first torque output, and a rotational engagement mechanism arranged to selectably couple the rotational motion of the input shaft to the light gear set and to selectably couple the rotational motion of the input shaft to the heavy gear set to rotate the cross-shaft adaptor using the light gear set or the heavy gear set.

In an aspect, the rotational engagement mechanism is a clutch plate having a first side face and a second side face, where the first side face of the clutch plate is arranged to engage with the light gear set and the second side face of the clutch plate is arranged to engage with the heavy gear set.

In an aspect, the rotational engagement mechanism has an inner circumferential surface, the inner circumferential surface including a plurality of splines arranged to non-rotatably engage with the cross-shaft adaptor.

In an aspect, the rotational engagement mechanism is arranged to translate between a first position, a second position, and a third position, wherein the first position is associated with a transfer of the first torque output from the light gear set to the rotational engagement mechanism, the second position is associated with a neutral mode, and the third position is associated with a transfer of the second torque output from the heavy gear set to the rotational engagement mechanism.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

FIG. 2A is a partial cross-sectional view of a leg assembly of a trailer landing gear assembly according to the present disclosure.

FIG. 2B is a partial cross-sectional view of a leg assembly of a trailer landing gear assembly according to the present disclosure.

FIG. 9A is a rear-side perspective view of a rotational engagement mechanism according to the present disclosure.

FIG. 9B is a front-side perspective view of a rotational engagement mechanism according to the present disclosure.

FIG. 9C is a front-side elevational view of a rotational engagement mechanism according to the present disclosure.

FIG. 18A is a rear-side perspective view of a rotational engagement mechanism according to the present disclosure.

FIG. 18B is a front-side perspective view of a rotational engagement mechanism according to the present disclosure.

FIG. 18C is a front elevational view of a rotational engagement mechanism according to the present disclosure.

DETAILED DESCRIPTION OF EMBODIMENTS

The present disclosure is related to actuators for landing gear systems for trailers. Specifically, the landing gear actuator assemblies discussed herein are arranged to selectably provide an increased torque output to a cross-shaft adaptor rotationally coupled to a cross-shaft of a trailer landing gear assembly. A rotational engagement mechanism is arranged to, in response to a remote signal provided by the operator of the trailer landing gear assembly, shift such that the rotational engagement mechanism can selectably couple the cross-shaft adaptor with a light gear set (in a one-speed arrangement) or selectably couple the cross-shaft adaptor with a light gear set or a heavy gear set (in a two-speed arrangement) as will be described below.

Figure 1:
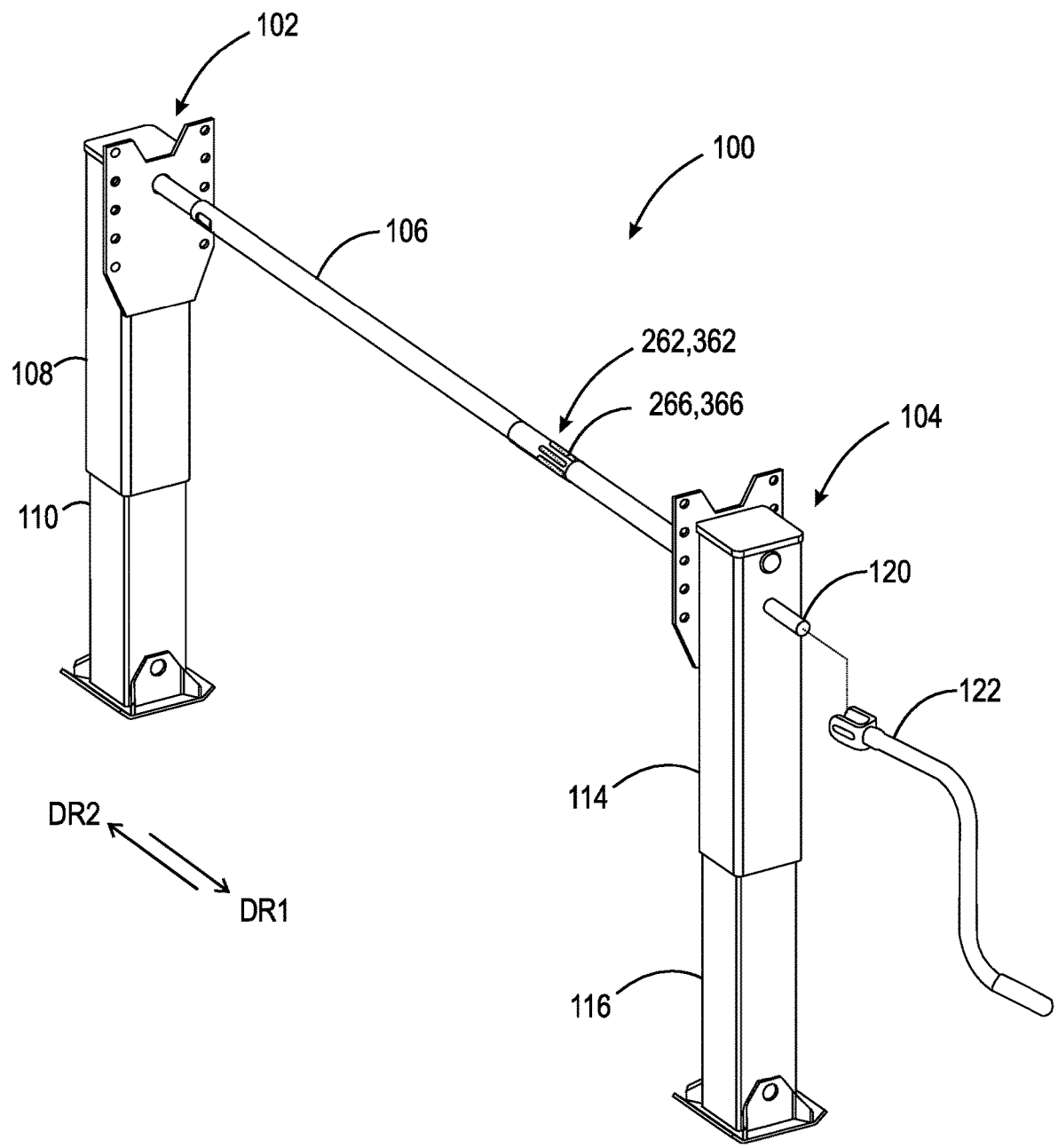
FIG. 1 is a perspective view of a trailer landing gear assembly according to the present disclosure.

The following description should be read in view of FIGS. 1-2B. FIG. 1 illustrates a perspective view of trailer landing gear assembly 100 according to the present disclosure. It should be appreciated that, although not illustrated for clarity, during operation of trailer landing gear assembly 100, a trailer may be provided, where trailer landing gear assembly 100 is fixedly secured to the underside of the trailer as will be described in detail below. Generally, trailer landing gear assembly 100 includes first leg assembly 102, second leg assembly 104, and cross-shaft 106.

As illustrated in FIGS. 2A and 2B, which show cross-sectional views of first leg assembly 102 and second leg assembly 104, respectively, first leg assembly 102 includes first leg housing 108, first leg 110, and first leg gear 112. First leg housing 108 is intended to be a substantially hollow longitudinal member arranged to telescopingly engage with first leg 110. First leg 110 is intended to fit within and slidingly engage with first leg housing 108 such that, when retracted a substantial portion of first leg 110 is arranged within first leg housing 108 and when expanded a substantial portion of first leg 110 is arranged outside of first leg housing 108. In other words, in the expanded state, first leg 110 has travelled a first distance D. First leg gear 112 is arranged between first leg 110 and cross-shaft 106 such that torque or rotational forces of cross-shaft 106 can be transferred 90 degrees to first leg 110 when operating trailer landing gear assembly 100 from the retracted state to the expanded state.

Second leg assembly 104 includes second leg housing 114, second leg 116, and second leg gear 118. Second leg housing 114 is intended to be a substantially hollow longitudinal member arranged to telescopingly engage with second leg 116. Second leg 116 is intended to fit within and slidingly engage with second leg housing 114 such that, when in the retracted state a substantial portion of second leg 116 is arranged within second leg housing 114 and when in an expanded state a substantial portion of second leg 116 is arranged outside of second leg housing 114. In other words, in the expanded state, second leg 116 has travelled a first distance D. Second leg gear 118 is arranged between second leg 116 and cross-shaft 106 (discussed below) such that torque or rotational forces of cross-shaft 106 can be transferred 90 degrees to second leg 116 when operating trailer landing gear assembly 100 from the retracted state to the expanded state. It should be appreciated that first leg housing 108, first leg 110, second leg housing 114, and second leg 116 are intended to be made from an alloy steel or aluminum; however, it should be appreciated that any material having a sufficient load capacity to withstand the weight of a trailer under maximum load conditions can be utilized. Additionally, both first leg 110 and second leg 116 can terminate proximate the ground upon which the trailer is intended to sit when disconnected from the tractor. The terminal ends of each leg may include a foot, as illustrated, to disperse the weight of the trailer when in the expanded state as well as provide a level surface upon which the legs may stand.

Between first leg assembly 102 and second leg assembly 104, is cross-shaft 106. Cross-shaft 106 is arranged to accept a rotational force or torque from landing gear actuator assembly 200 (or landing gear actuator assembly 300), discussed below, and transfer that rotational force equally to first leg assembly 102 and second leg assembly 104 via at least first leg gear 112 and second leg gear 118, respectively. It should be appreciated that more than one gear can be provided between each respective leg housing and each respective leg. Additionally, cross-shaft 106 is intended to be one continuous shaft, i.e., extending between first leg assembly 102 and second leg assembly 104, unbroken; however, it should be appreciated that cross-shaft 106 can include any combination of shafts which span the distance between first leg assembly 102 and second leg assembly 104, e.g., two or more shafts rotationally secured to each other. It should further be appreciated that landing gear actuator assembly 200 (or landing gear actuator assembly 300) can be arranged to engage with cross-shaft 106 at any point between first leg assembly 102 and second leg assembly 104, or outside of first leg assembly 102 or second leg assembly 104, e.g., on cross-shaft projection 120 as discussed below.

Cross-shaft 106 has a first end and a second end, e.g., where the first end is arranged proximate to first leg assembly 102 and second end is arranged proximate second leg assembly 104. Furthermore, a cross-shaft projection is provided, i.e., cross-shaft projection 120, which can be non-rotatably engaged with the first end or the second end of cross-shaft 106. As illustrated in FIG. 1, cross-shaft projection 120 is non-rotatably secured proximate to the second end of cross-shaft 106. Cross-shaft projection 120 is intended to project outwardly from second leg assembly 104 such that an operator can attach a manual hand crank, i.e., crank handle 122. Crank handle 122 can be utilized by an operator when landing gear actuator assembly 200 (or landing gear actuator assembly 300) is in a neutral mode NM as discussed below.

Trailer landing gear assembly 100 can also include at least one sensor, i.e., first sensor 124 and/or second sensor 126 (illustrated in FIGS. 2A-2B). First sensor 124 and/or second sensor 126 are arranged to gather position information associated with the position of, e.g., first leg 110 or second leg 116 with respect to a fixed component of trailer landing gear assembly 100 or the trailer on which trailer landing gear assembly 100 is attached. For example, first sensor 124 can be fixedly secured to first leg housing 108, first leg 110, first leg gear 112, cross-shaft 106, or coupling shaft 142. Additionally, first sensor 124 and second sensor 126 can be selected from: an angular position sensor, a gyroscope, an accelerometer, a magnetometer, a rotary encoder, an optical encoder, a Hall-effect sensor, a linear encoder, an ultrasonic sensor, a non-contact laser line distance sensor, a radio frequency sensor, a proximity sensor, a strain gauge, a force-sensitive load cell, a capacitive load cell, or any other sensor that can be utilized to derive the distance first leg 110 has travelled or derive the distance between the ground beneath first leg 110 and the first leg housing 108. Second sensor 126 can be positioned similarly with respect to second leg assembly 104.

Additionally, and although not illustrated, trailer landing gear assembly 100 can also include a controller C arranged to send and receive electrical signals which can operate to remotely engage various aspects of the system. In one example, the controller includes a processor P and a memory M arranged to execute and store, respectively, at least a set of non-transitory computer-readable instructions I. Controller C is also arranged to receive a plurality of inputs and/or sensor data from the operator and/or sensors, respectively, to remotely engage various aspects of the system which will be discussed below in detail. In one example, controller C can be positioned within the cab of the tractor or on the exterior of the trailer for ease of use by the operator.

One-Speed Landing Gear Actuator Assembly

Figure 3:
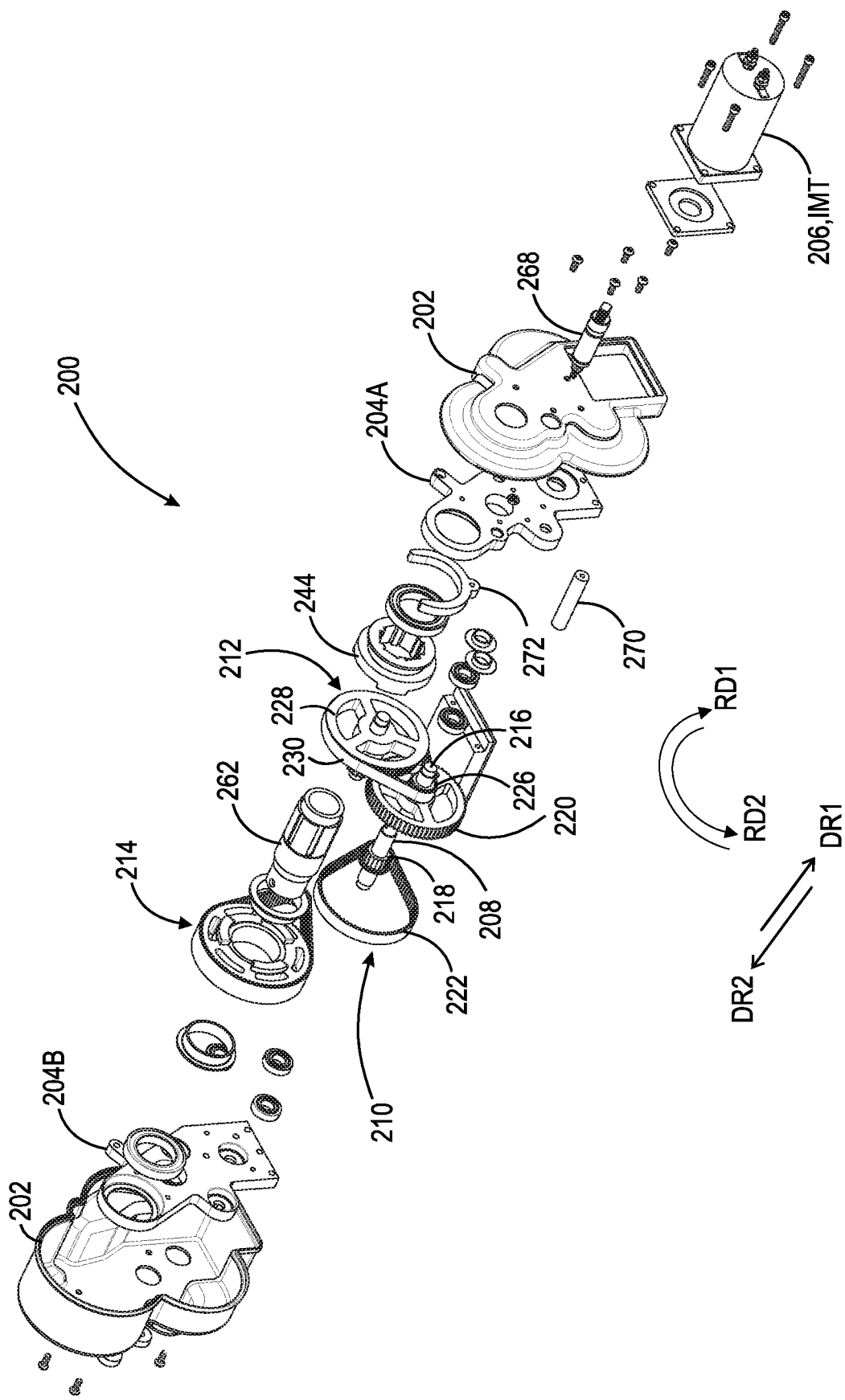
FIG. 3 is a left-side exploded view of a landing gear actuator assembly according to the present disclosure.
Figure 4:
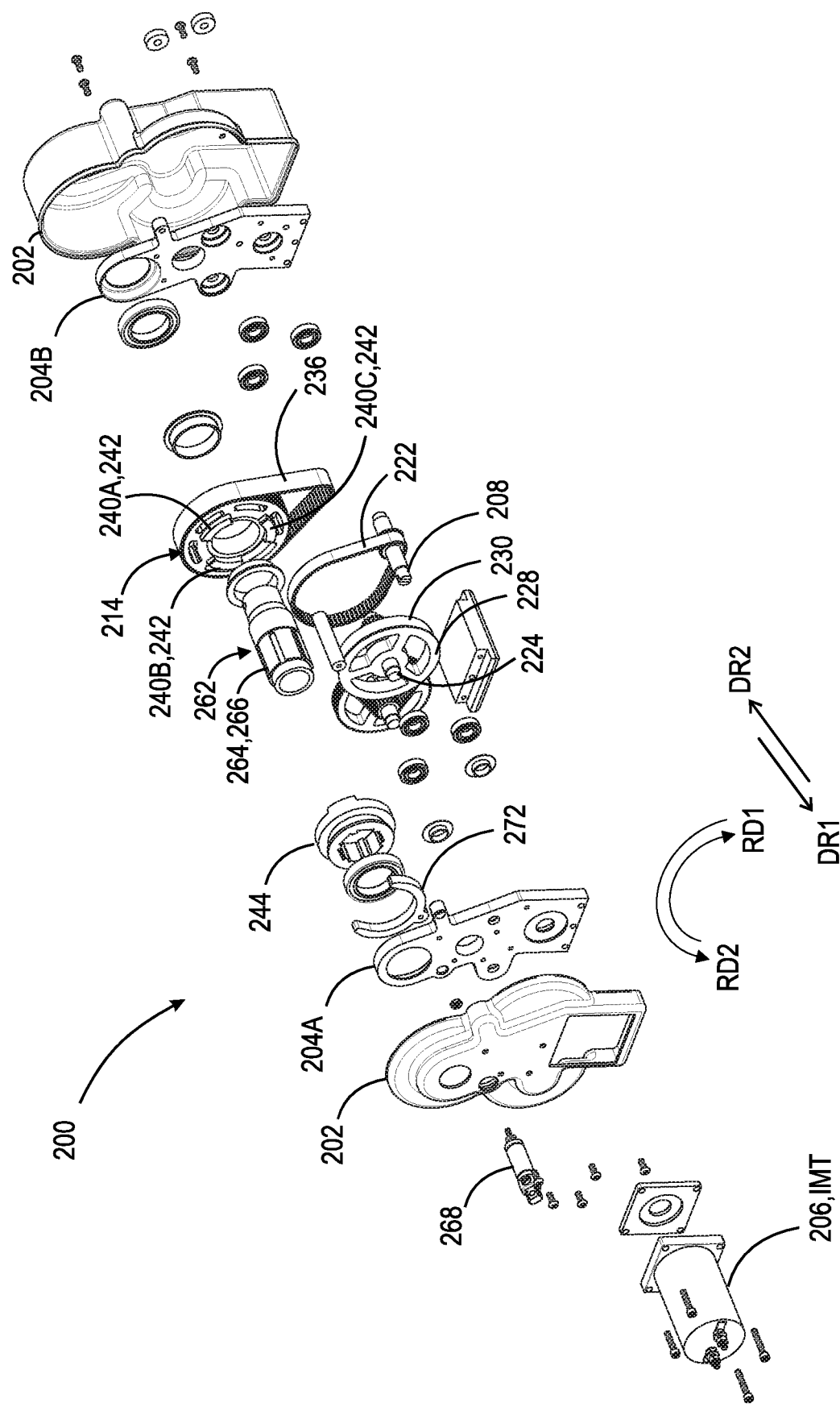
FIG. 4 is a right-side exploded view of a landing gear actuator assembly according to the present disclosure.
Figure 5:
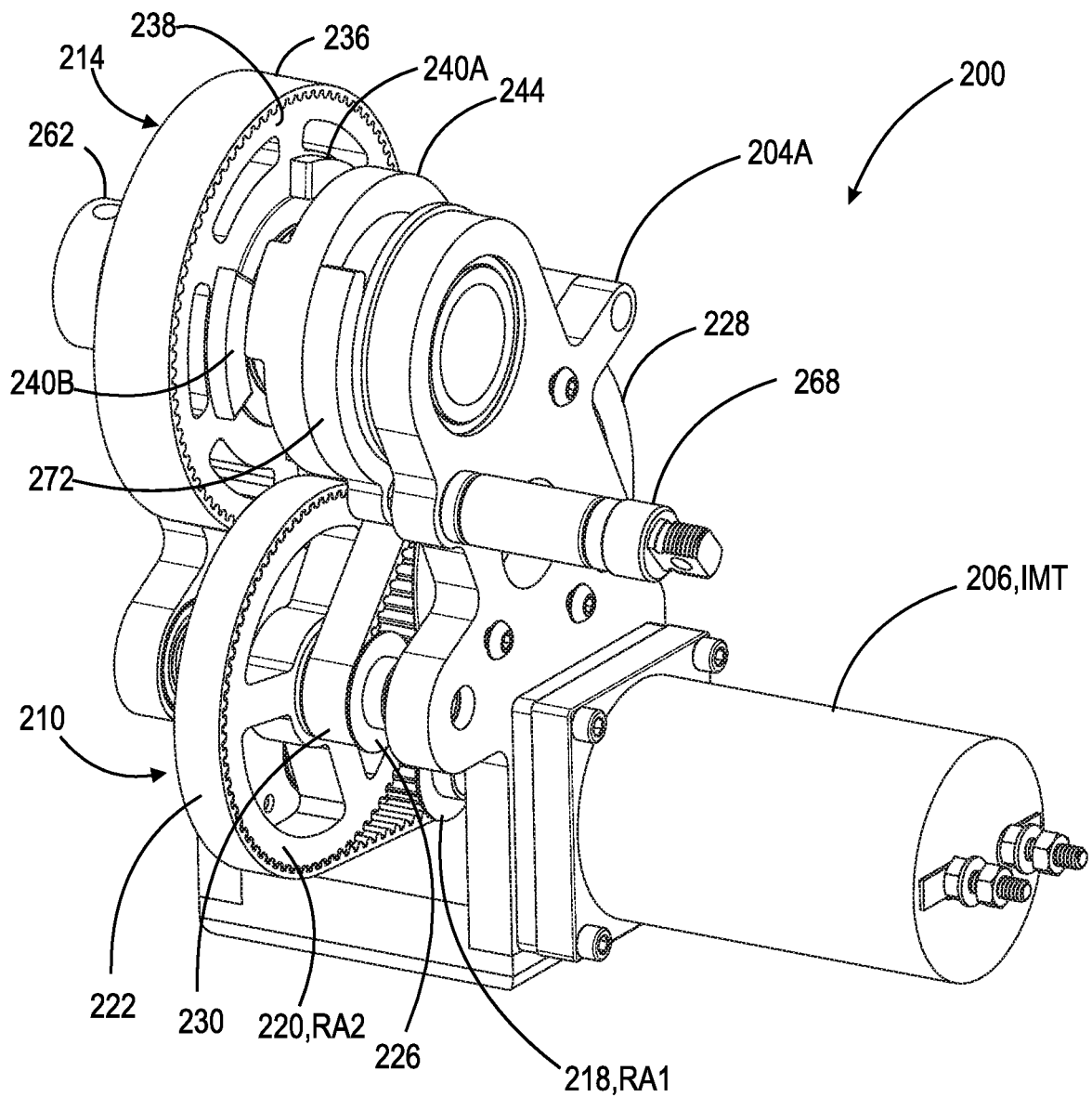
FIG. 5 is a front-left perspective view of a landing gear actuator assembly according to the present disclosure.
Figure 6:
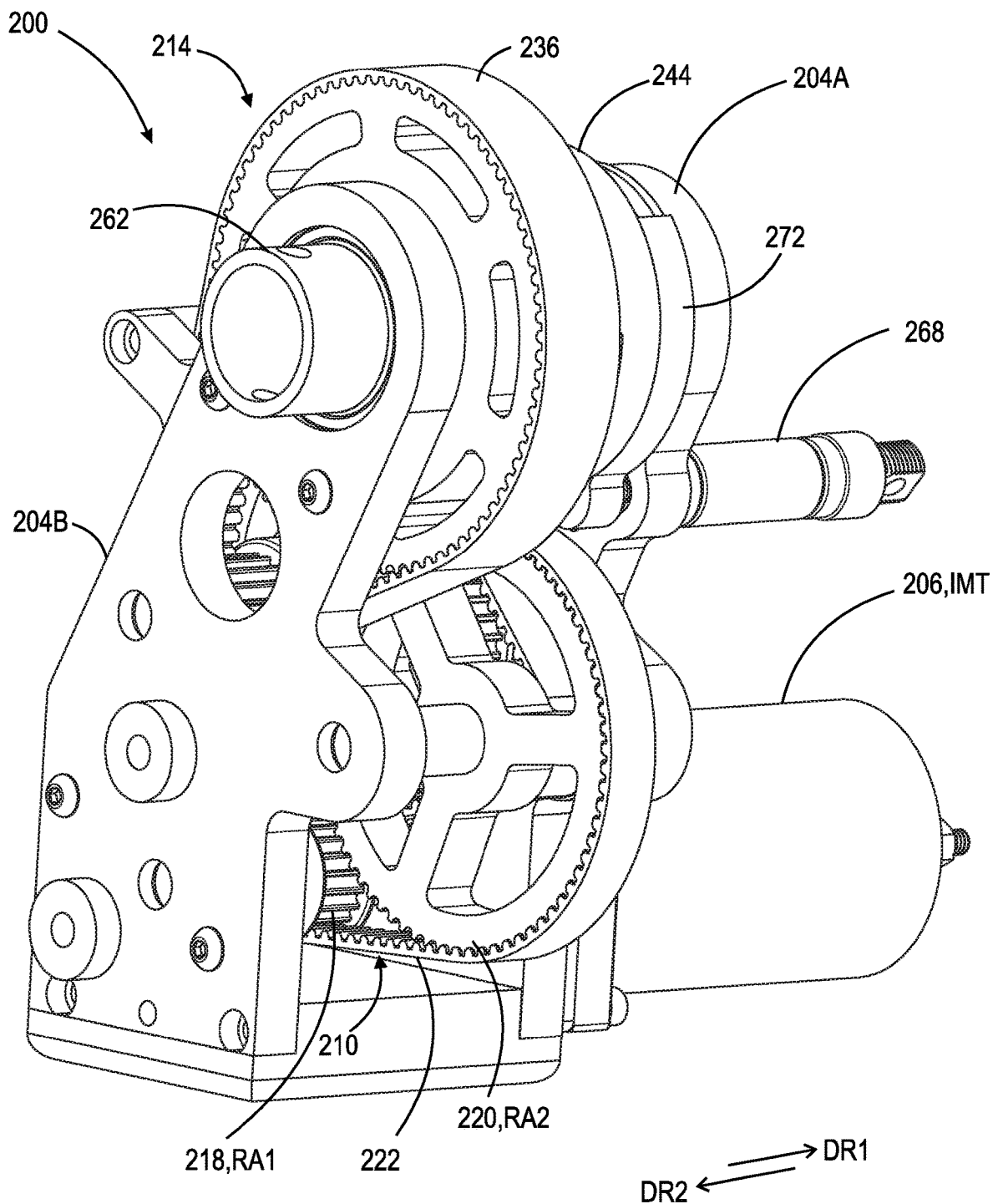
FIG. 6 is a rear-left perspective view of a landing gear actuator assembly according to the present disclosure.
Figure 7:
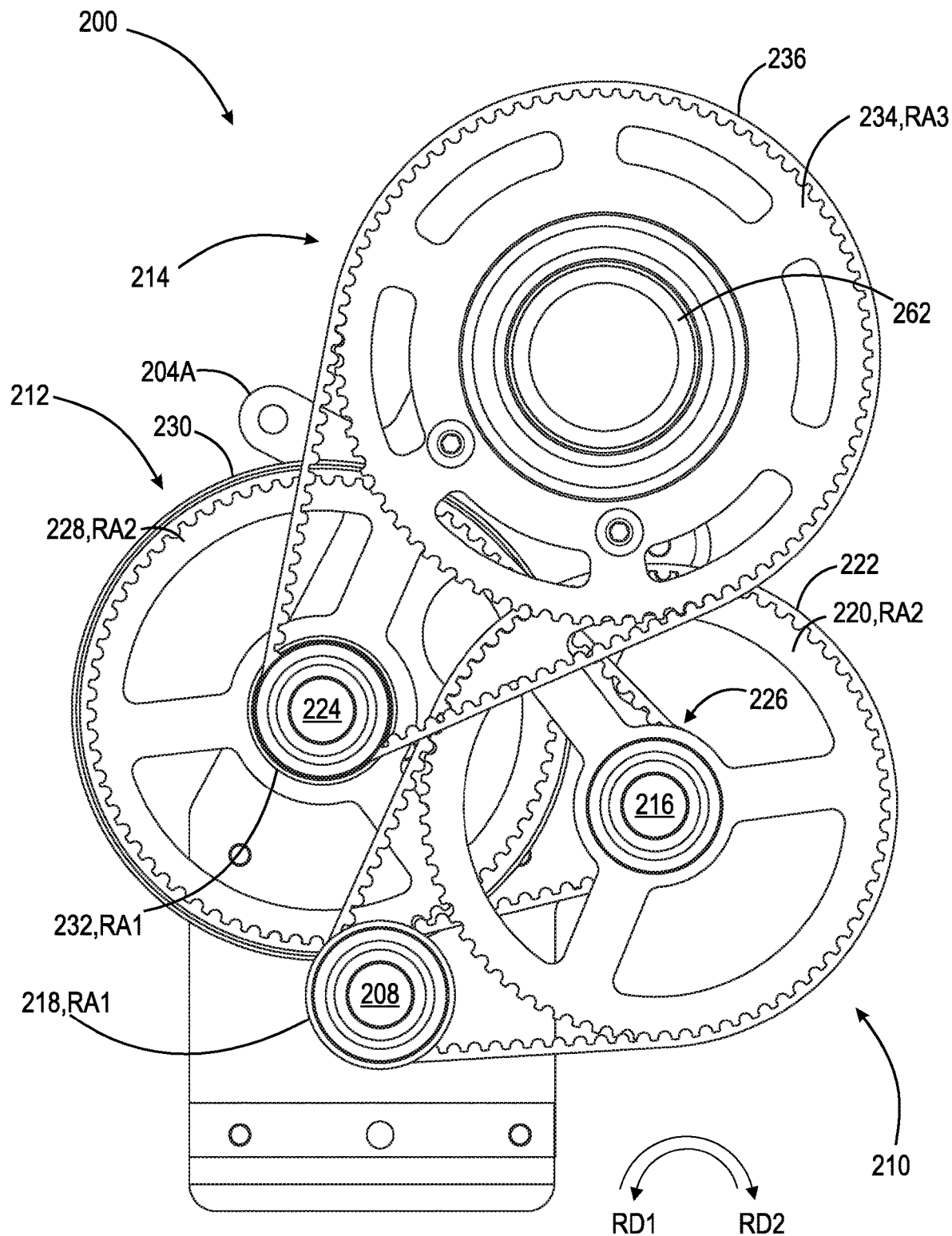
FIG. 7 is a rear elevational view of a landing gear actuator assembly with a rear mounting plate removed according to the present disclosure.
Figure 8:
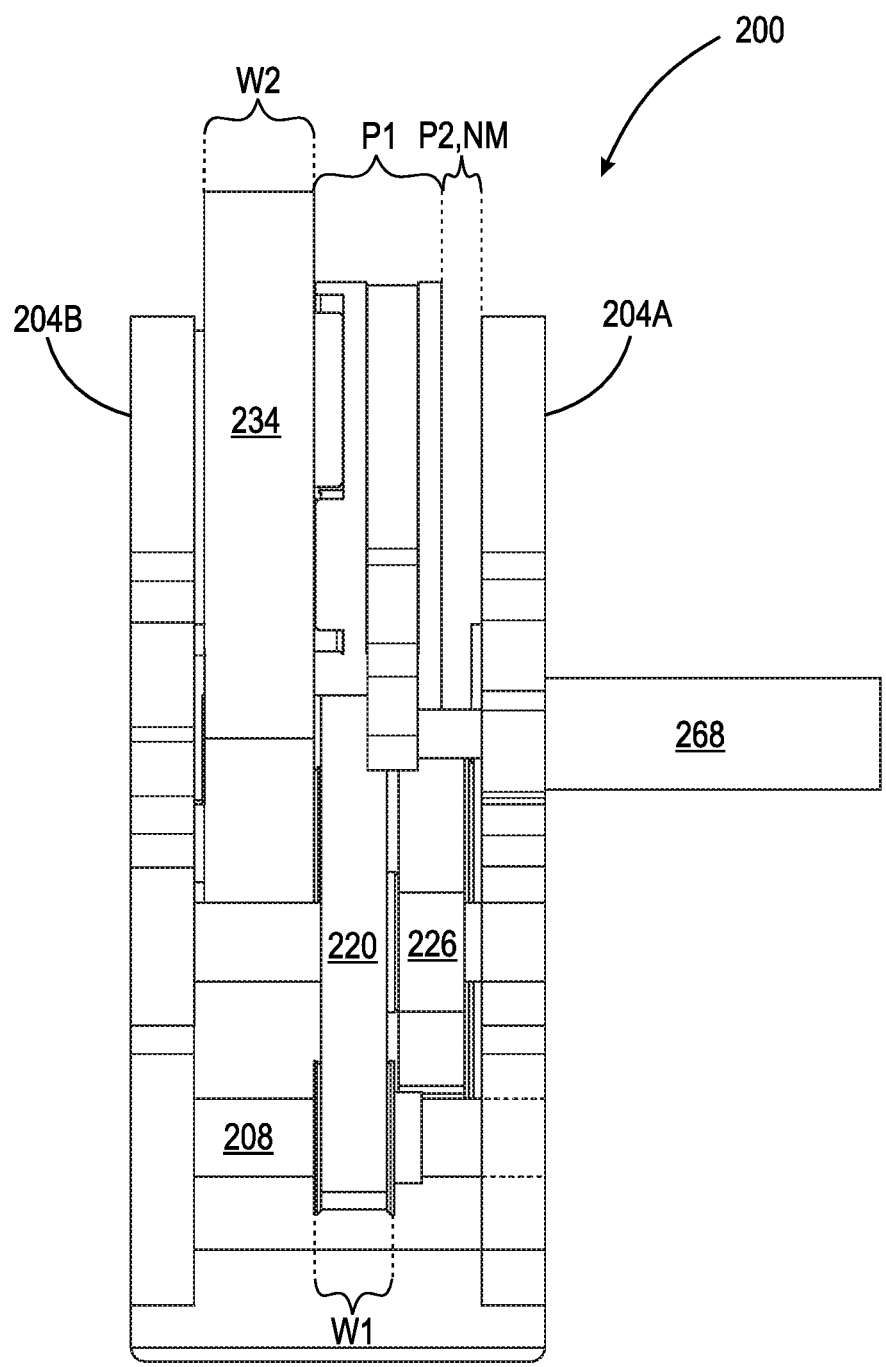
FIG. 8 is a left-side elevational view of a landing gear actuator assembly according to the present disclosure.
Figure 10:
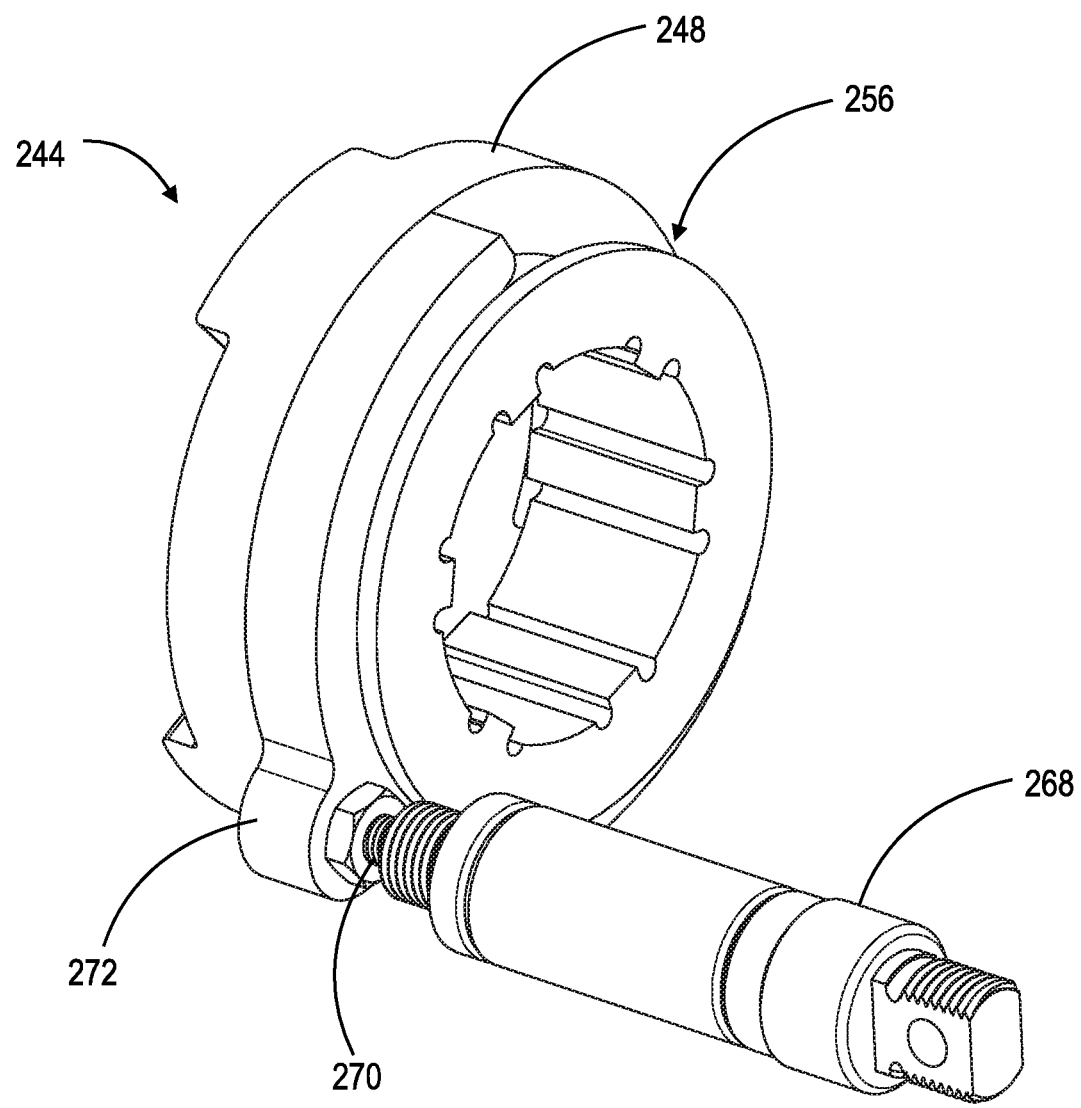
FIG. 10 is a front-side perspective of a rotational engagement mechanism secured to an actuator and shift fork according to the present disclosure.

The following description should be read in view of FIGS. 3-10. FIGS. 3 and 4 illustrate left-side and right-side exploded views of landing gear actuator assembly 200, respectively. FIGS. 5-8 illustrate various assembled views of landing gear actuator assembly 200. FIGS. 9A-9C illustrate various view of rotational engagement mechanism 244 (discussed below) and FIG. 10 illustrates rotational engagement mechanisms interaction with actuator 268 (discussed below.) With reference now to FIGS. 3-8, landing gear actuator assembly 200 includes a cover or housing 202, mounting plates 204A-204B, motor 206, and input shaft 208. Housing 202 is intended to be an enclosure arranged to at least partially enclose the various components associated with landing gear actuator assembly 200 as will be described below. Housing 202 can be made from metals, e.g., aluminum or stamped steel, hardenable polymers, e.g., plastics such as High Density Polyethylene (HDPE) or Polyether Ether Ketone (PEEK), or any material of sufficient durability to withstand harsh environmental conditions and/or conditions conducive to corrosion experienced by vehicles, e.g., oils contained in road-spray, rust, salt exposure, etc. Mounting plates 204A-204B are arranged within housing 202 and configured to support and organize the various rotating components of the first gear stage 210, second gear stage 212, and the first gear set 214 (all discussed below in detail). It should be appreciated that mounting plates 204A-204B may be arranged to receive the shafts and gears discussed below directly or indirectly via a device that mitigates rotational friction, e.g., rotational bearings. It should also be appreciated that mounting plates 204A-204B may optionally be included with landing gear actuator assembly 200 and the shafts and gears discussed below may be arranged to connect directly or indirectly with respective portions of housing 202 rather than mounting plates 204A-204B.

Motor 206 is arranged to receive a remote signal, e.g., corresponding to an input from an operator of a tractor (arranged to couple with a trailer having a trailer landing gear assembly 100), and provide a rotational motion having an initial motor torque IMT to input shaft 208. It should be appreciated that motor 206 can be any motor capable of generating rotational motion in response to a remote signal, e.g., an electric motor, a pneumatic motor, or a hydraulic motor. Input shaft 208 is arranged to receive the initial motor torque IMT from motor 206 and rotate in a first rotational direction RD1 (illustrated in FIG. 3). It should be appreciated that input shaft 208 is configured to matingly engage with a plurality of bearings arranged on or in the mounting plates 204A and 204B, or, on or in housing 202.

As mentioned above, landing gear actuator assembly 200 further includes multiple gear assemblies and at least one gear set configured to alter the initial motor torque IMT provided by motor 206 to input shaft 208 such that landing gear actuator assembly 200 can provide rotational motion to cross-shaft 106 of trailer landing gear assembly 100 at a higher torque than the initial motor torque IMT. In one example, landing gear actuator assembly 200 further includes a first gear stage 210, a second gear stage 212, and a first gear set 214 (also referred to as "light gear set 214").

First gear stage 210 is arranged between input shaft 208 and a first gear stage shaft 216. First gear stage 210 includes a first gear wheel 218 arranged to rotate about input shaft 208 and a second gear wheel 220 arranged to rotate about first gear stage shaft 216. First gear wheel 218 has a first radius RA1 and a first width W1 as well as an outer circumferential surface which includes a plurality of gear teeth. Second gear wheel 220 has a second radius RA2 where second radius RA2 is greater than first radius RA1. Second gear wheel 220 may also have a width corresponding to the width of the first gear wheel 218, i.e., first width W1, as well as an outer circumferential surface with a plurality of gear teeth.

As illustrated in FIGS. 3-8, first gear stage 210 further includes a first gear stage connector 222 arranged between first gear wheel 218 and second gear wheel 220 to transfer rotational motion and torque between both gears. It should be appreciated that first gear stage connector 222 may be any device capable of rotationally coupling first gear wheel 218 and second gear wheel 220. For example, first gear stage connector 222 may be a belt, ribbed belt, or chain. It should also be appreciated that first gear wheel 218 and second gear wheel 220 may be coupled directly, e.g., via the respective pluralities of teeth arranged on each gear wheel's outer circumferential surface. Additionally, it should be appreciated that first gear wheel 218 and second gear wheel 220 could also be coupled via additional gear arrangements or components, e.g., bevel gear arrangements. First gear stage 210 is arranged to reduce the initial motor speed and increase or step-up the initial motor torque IMT between input shaft 208 and first gear stage shaft 216. It should be appreciated that the ratio between first radius RA1 and second radius RA2 of first gear wheel 218 and second gear wheel 220 is proportional to the increase in torque output and inversely proportional to the speed transferred across the first gear stage 210. As is known in the art, these ratios may be utilized to determine a gear ratio across first gear stage 210. In one example, the gear ratio across first gear stage 210 is selected from a range of ratios between 1:2-1:5. In one example, the selected gear ratio across first gear stage 210 is 1:3.684.

Similarly, and for the purpose of further increasing the torque output of landing gear actuator assembly 200, landing gear actuator assembly 200 may optionally include a second gear stage 212. Second gear stage 212 is arranged between first gear stage shaft 216 and a second gear stage shaft 224. Second gear stage 212 includes a first gear wheel 226 arranged to rotate about first gear stage shaft 216 and a second gear wheel 228 arranged to rotate about second gear stage shaft 224. First gear wheel 226 has a first radius RA1 and a first width W1 as well as an outer circumferential surface which includes a plurality of gear teeth. Second gear wheel 228 has a second radius RA2 where second radius RA2 is greater than first radius RA1. Second gear wheel 228 may also have a width corresponding to the width of the first gear wheel 226, i.e., first width W1, as well as an outer circumferential surface with a plurality of gear teeth.

As illustrated in FIGS. 3-7, second gear stage 212 further includes a second gear stage connector 230 arranged between first gear wheel 226 and second gear wheel 228 to transfer rotational motion and torque between both gears. It should be appreciated that second gear stage connector 230 may be any device capable of rotationally coupling first gear wheel 226 and second gear wheel 228. For example, second gear stage connector 230 may be a belt, ribbed belt, or chain. It should also be appreciated that first gear wheel 226 and second gear wheel 228 may be coupled directly, e.g., via the respective pluralities of teeth arranged on each gear wheel's outer circumferential surface. Additionally, it should be appreciated that first gear wheel 226 and second gear wheel 228 could also be coupled via additional gear arrangements or components, e.g., bevel gear arrangements. Second gear stage 212 is arranged to reduce the speed and increase or step-up the torque between first gear stage shaft 216 and second gear stage shaft 224. It should be appreciated that the ratio between first radius RA1 and second radius RA2 of first gear wheel 226 and second gear wheel 228 is proportional to the increase in torque output and inversely proportional to the speed transferred across the second gear stage 212. As is known in the art, these ratios may be utilized to determine a gear ratio across second gear stage 212. In one example, the gear ratio across second gear stage 212 is selected from a range of ratios between 1:2-1:5. In one example, the selected gear ratio across second gear stage 212 is 1:3.684.

As discussed above, landing gear actuator assembly 200 further includes a first gear set 214 (also referred to as "light gear set 214"). Within landing gear actuator assembly 200, first gear set 214 is arranged to be selectably coupled to cross-shaft adaptor 262 (discussed below) such that rotational motion and/or torque can be selectably transferred from second gear stage 212 to cross-shaft 106. Light gear set 214 includes a first light gear wheel 232 arranged to rotate about second gear stage shaft 224 and a second light gear wheel 234 arranged to rotate about cross-shaft 106. First light gear wheel 232 has a first radius RA1 and a second width W2, where the second width W2 is greater than the first width W1. Additionally, first light gear wheel 232 includes an outer circumferential surface which includes a plurality of gear teeth. Second light gear wheel 234 has a second radius RA2 where second radius RA2 is greater than first radius RA1. Second gear wheel 234 also has a width corresponding to the width of the first light gear wheel 232, i.e., second width W2, as well as an outer circumferential surface with a plurality of gear teeth.

As illustrated in FIGS. 3-7, light gear set 214 further includes a light gear set connector 236 arranged between first light gear wheel 232 and second light gear wheel 234 to transfer rotational motion and torque between both gears. It should be appreciated that light gear set connector 236 may be any device capable of rotationally coupling first light gear wheel 232 and second light gear wheel 234. For example, light gear set connector 236 may be a belt, ribbed belt, or chain. It should also be appreciated that first light gear wheel 232 and second light gear wheel 234 may be coupled directly, e.g., via the respective pluralities of teeth arranged on each gear wheel's outer circumferential surface. Additionally, it should be appreciated that first light gear wheel 232 and second light gear wheel 234 could also be coupled via additional gear arrangements or components, e.g., bevel gear arrangements. Light gear set 214 is arranged to reduce the speed and increase or step-up the torque between second gear stage shaft 224 and cross-shaft 106 (as will be discussed below). It should be appreciated that the ratio between first radius RA1 and second radius RA2 of first light gear wheel 232 and second light gear wheel 234 is proportional to the increase in torque output and inversely proportional to the speed transferred across the light gear set 214. As is known in the art, these ratios may be utilized to determine a gear ratio across light gear set 214. In one example, the gear ratio across light gear set 214 is selected from a range of ratios between 1:2-1:6. In one example, the selected gear ratio across light gear set 214 is 1:4.444.

Second light gear wheel 234 further includes a first side face 238. First side face 238 of second light gear wheel 234 includes a first surface, the first surface having a first plurality of protrusions 240A-240C extending therefrom. First plurality of protrusions 240A-240C extend away from the surface of first side face 238 in a direction parallel to the axis of rotation of cross-shaft 106, i.e., first direction DR1. In one example, each protrusion of plurality of protrusions 240A-240C is arranged about cross-shaft 106 and spaced equal radial distances from each other, i.e., each protrusion is arranged 120 degrees from each other about cross-shaft 106. Although three protrusions are shown, it should be appreciated that more protrusions or less protrusions, e.g., more than three or less than three, can be utilized. Additionally, it should be appreciated that each protrusion of plurality of protrusions has an outer edge corresponding to a first arc length 242.

Landing gear actuator assembly 200 further includes a rotational engagement mechanism 244. Rotational engagement mechanism 244 is arranged between second light gear wheel 234 of light gear set 214. In one example, as illustrated in FIGS. 9A-9C, rotational engagement mechanism 244 is a single-sided clutch plate arranged to selectably engage and selectably disengage with light gear set 214. Although described and illustrated as a dog-clutch-style clutch plate, it should be appreciated that any mechanism capable of selectably engaging or disengaging with light gear set 214 may be utilized, e.g., a friction clutch assembly, a fluid clutch assembly, a plurality of gears or shifting bevel gear arrangements, etc.

As illustrated in FIGS. 9A-9C, rotational engagement mechanism 244 includes a first side face 246, outer circumferential surface 248, and inner circumferential surface 250. First side face 246 of rotational engagement mechanism 244 includes a first surface, the first surface having a first plurality of recesses 252A-252C extending inward therefrom. First plurality of recesses 252A-252C extend inward from the first surface of first side face 246 in a direction parallel to the axis of rotation of cross-shaft 106, i.e., first direction DR1, and arranged to selectably receive respective protrusions of first plurality of protrusions 240A-240C discussed above. In one example, each recess of plurality of recesses 252A-252C is arranged about cross-shaft 106 and spaced equal radial distances from each other, i.e., each recess is arranged 120 degrees from each other about cross-shaft 106. Although three recesses are shown, it should be appreciated that more recesses or less recesses, e.g., more than three or less than three, can be utilized. Additionally, it should be appreciated that each recess of plurality of recesses 252A-252C has an outer edge corresponding to a second arc length 254, where the second arc length 254 is greater than first arc length 242 of each of the first plurality of protrusions 240A-240C. It should be appreciated that the increased area afforded by having first plurality of recesses 252A-252C having a greater arc length, i.e., second arc length 254, allows coupling between light gear set 214 and rotational engagement mechanism 244 while one or both components are rotating. The additional radial space provided by the larger second arc length allows for a smoother coupling between light gear set 214 and rotational engagement mechanism 244.

Rotational engagement mechanism 244 further includes outer circumferential surface 248. Outer circumferential surface 248 includes an annular recess 256. Annular recess 256 is arranged to receive at least a portion of shift fork 272 (discussed below and illustrated in at least FIG. 10). Furthermore, rotational engagement mechanism 244 also includes inner circumferential surface 250 which includes a plurality of splines 258 arranged to engage with cross-shaft adaptor 262 (discussed below). Plurality of splines 258 of rotational engagement mechanism are arranged to receive the rotational motion and torque selectably provided to the rotational engagement mechanism, e.g., by light gear set 214, and transfer that rotational motion or torque to complementary recesses (e.g., plurality of recesses 266) of cross-shaft adaptor 262 (discussed below). Each spline protrusion includes at least one radius relief cut 260. It should be appreciated that more than one radius relief cut 260 may be provided adjacent each spline protrusion of plurality of splines 258. For example, as illustrated in FIG. 9C, two radius relief cuts 260A and 260B are provided. Radius relief cuts 260A and 260B are arranged to expose more surface area on the sides of each spline protrusion to increase contact and ensure torque transfer between each spline of plurality of splines 258 and the respective recesses of cross-shaft adaptor 262.

Landing gear actuator assembly 200 further includes cross-shaft adaptor 262 arranged to be secured to cross-shaft 106 of trailer landing gear assembly 100 as illustrated in FIG. 1. It should be appreciated that cross-shaft adaptor 262 can be coupled to cross-shaft 106 in a variety of ways, e.g., may be integral to cross-shaft 106 or may be removably secured by at least one fastener, i.e., a bolt and nut arrangement. Cross-shaft adaptor 262 has an outer circumferential surface 264 with a plurality of recesses 266 arranged thereon. As described above, plurality of recesses 266 are arranged to receive respective splines of plurality of splines 258 to receive rotational motion and/or torque transferred by, for example, light gear set 214.

As illustrated in at least FIGS. 5, 6, 8, and 10, landing gear actuator assembly 200 also includes an actuator 268 having an actuator arm 270 securely connected to a shift fork 272. Actuator 268 is arranged to receive a remote signal, e.g., corresponding to an input from an operator of a tractor (arranged to couple with a trailer having a trailer landing gear assembly 100), and provide translational motion of arm 270. It should be appreciated that actuator 268 can be any actuator capable of generating translational motion in response to a remote signal, e.g., an electric actuator (e.g., an electromechanical actuator), a pneumatic actuator, or a hydraulic actuator. Shift fork 272 has a lower portion and a forked portion. The lower portion is arranged to be fixedly secured to arm 270 of actuator 268, and the forked portion is arranged to slidingly engage with at least a portion of annular recess 256. This sliding engagement within annular recess 256 allows rotational engagement mechanism 244 to rotate about cross-shaft 106 while maintaining axial engagement with the forked portion of shift fork 272. Although rotational engagement mechanism 244 is allowed to freely rotate while engaged with the forked portion of shift fork 272, shift fork 272 may still impart axial force, i.e., a force in the first direction DR1 or the second direction DR2 to operably shift rotational engagement mechanism 244 from a first position P1 to a second position P2, where first position P1 is associated with an engagement between first plurality of protrusions 240A-240C of second light gear wheel 234 and first plurality of recess 252A-252C of rotational engagement mechanism 244, and the second position P2 is associated with a neutral mode NM, where there is no contact or engagement between first plurality of protrusions 240A-240C of second light gear wheel 234 and first plurality of recess 252A-252C of rotational engagement mechanism 244. These positions will be described below with reference to the operation of landing gear actuator assembly 200. It should be appreciated that, although not illustrated, actuator 268 may include one or more biasing elements, e.g., a spring, arranged to mechanically bias actuator 268, arm 270, and shift fork 272 such that when no force is applied in response to any of the signals discussed above or below, the resting position of those components is second position P2 associated with a neutral mode NM. As discussed below, a further or additional signal may be provided by an operator of the tractor, to provide mechanical force against these exemplary biasing elements to shift rotational engagement mechanism 244 from second position P2 to first position P1.

During operation of landing gear actuator assembly 200, a signal is provided to motor 206 connected to input shaft 208 which operates to generate an initial rotational motion in first rotational direction RD1 with an initial motor torque IMT of input shaft 208. The initial motor torque IMT is increased through first gear stage 210 at a gear ratio of 1:3.684. Optionally, the torque is increased again through a second gear stage 212 at a gear ratio of 1:3.684. Once provided to light gear set 214, the torque is increased a third time between first light gear wheel 232 and second light gear wheel 234 such that the gear ratio between input shaft 208 and second light gear wheel 234 of light gear set 214 is approximately 1:60. It should be appreciated that the gear ratios of each gear stage can be adjusted so that the overall gear ratio between input shaft 208 and second gear wheel 234 of light gear set 214 can range between 1:30-1:90. The operator of the tractor may further provide an additional signal to actuator 268, which responsively provides translational motion of arm 270 and rotational engagement mechanism 244 from a second position P2 in a neutral mode NM to a first position P1 such that first plurality of recess 252A-252C engage with and receive rotational motion and torque from first plurality of protrusions 240A-240C, respectively. In first position P1, rotational motion and torque is transferred from light gear set 214 through first plurality of protrusions 240A-240C, to first plurality of recesses 252A-252C of rotational engagement mechanism 244. Rotational engagement mechanism 244 may then provide the rotation and torque to cross-shaft adaptor 262 via plurality of splines 258 on inner circumferential surface 250 of rotational engagement mechanism 244. The interaction between plurality of splines 258 and the plurality of recesses 266 on cross-shaft adaptor 262 provide the rotational motion and torque to cross-shaft 106. This rotational motion and torque to cross-shaft 106 may be utilized by trailer landing gear assembly 100 to raise or lower the respective leg assemblies 102 and 104 (shown in FIGS. 2A-2B), to switch trailer landing gear assembly 100 between a retracted state and expanded state or vice versa. Should the operator of landing gear actuator assembly 200 wish to stop raising or lowering the respective leg assemblies, a further signal can be sent to actuator 268 which operates to translate arm 270, shift fork 272, and rotational engagement mechanism 244 from first position P1 to second position P2 associated with a neutral mode NM where there is no engagement between first plurality of protrusions 240A-240C of second light gear wheel 234 and first plurality of recess 252A-252C of rotational engagement mechanism 244. In this position, the inherent frictional forces of the acme gears of the respective leg assemblies will maintain the current position of the legs with respect to the ground beneath the trailer and motor 206 may be shut down. It should be appreciated that the reverse is possible, e.g., the initial rotational motion of motor 206 can be in second rotational direction RD2, opposite first rotational direction RD1. In this mode, the same selectable engagement described above may be performed to induce opposite motion on the leg assemblies as initially provided. In other words, if initial motion of motor 206 in first rotational direction DR1 operates to raise the respective leg assemblies, initial motion of motor 206 in second rotational direction DR2 may operate to lower the respective leg assemblies using the same mechanisms and components described above.

Two-Speed Landing Gear Actuator Assembly

Figure 11:
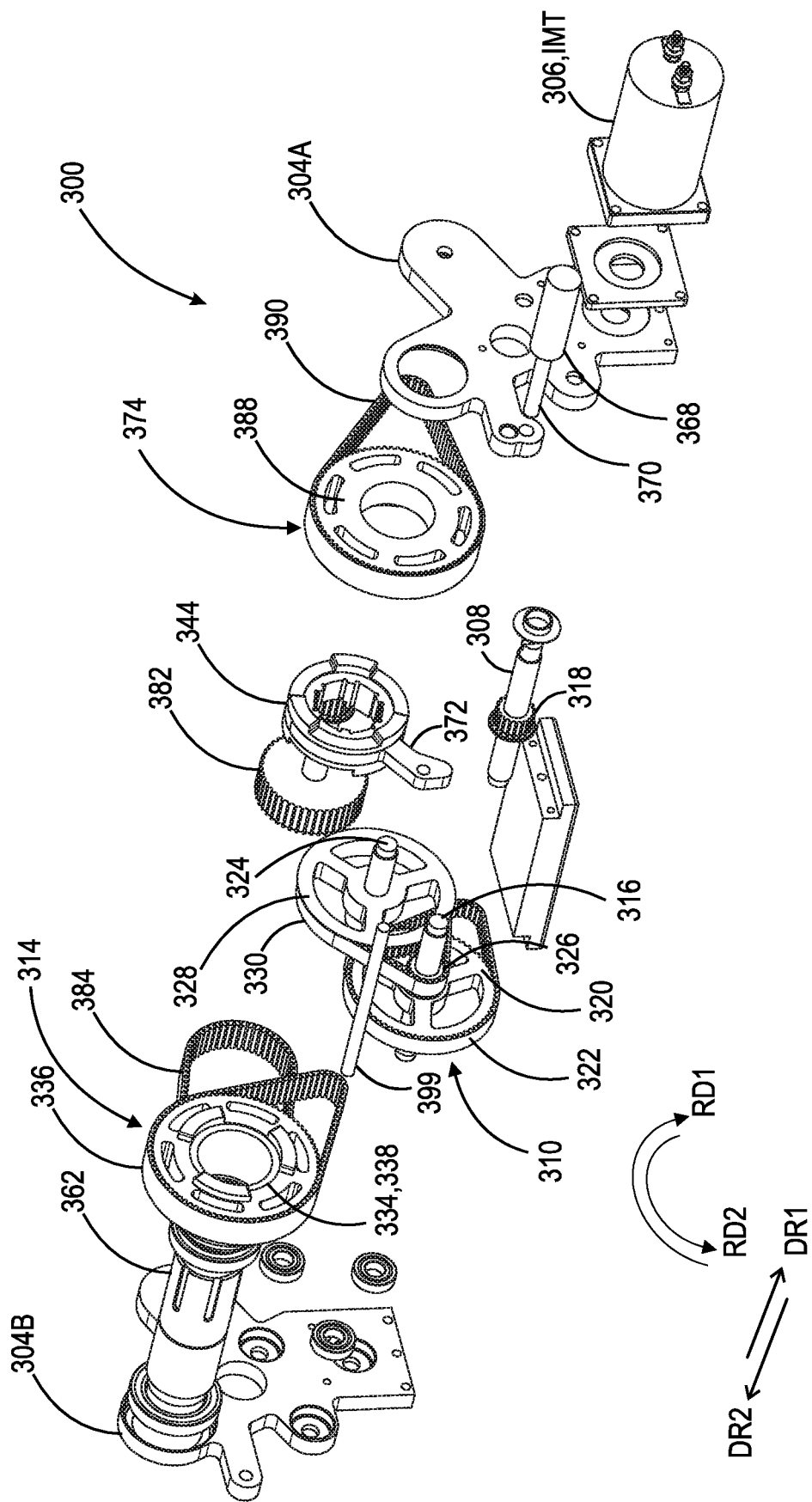
FIG. 11 is a right-side exploded view of a landing gear actuator assembly according to the present disclosure.
Figure 12:
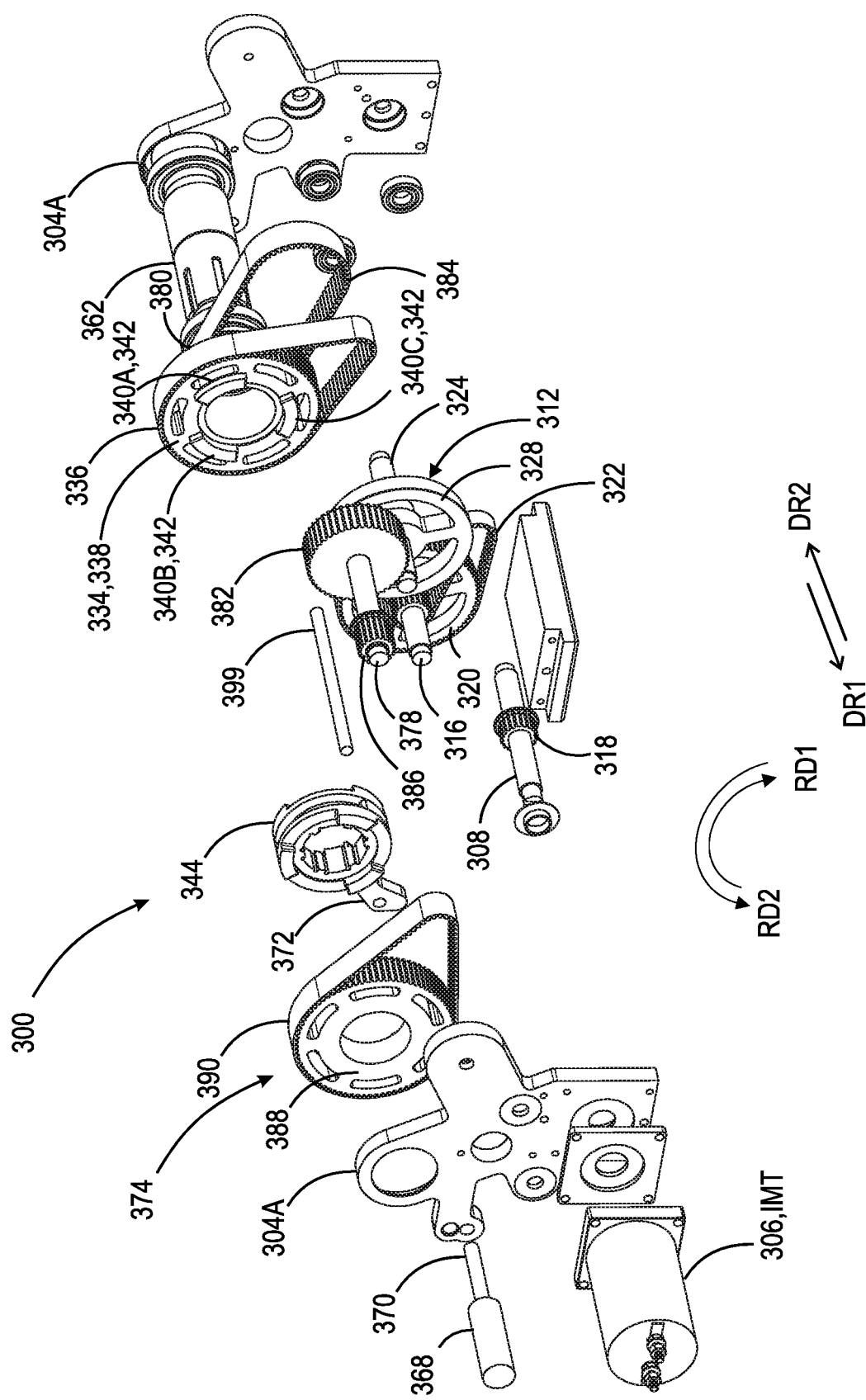
FIG. 12 is a front-left perspective view of a landing gear actuator assembly according to the present disclosure.
Figure 13:
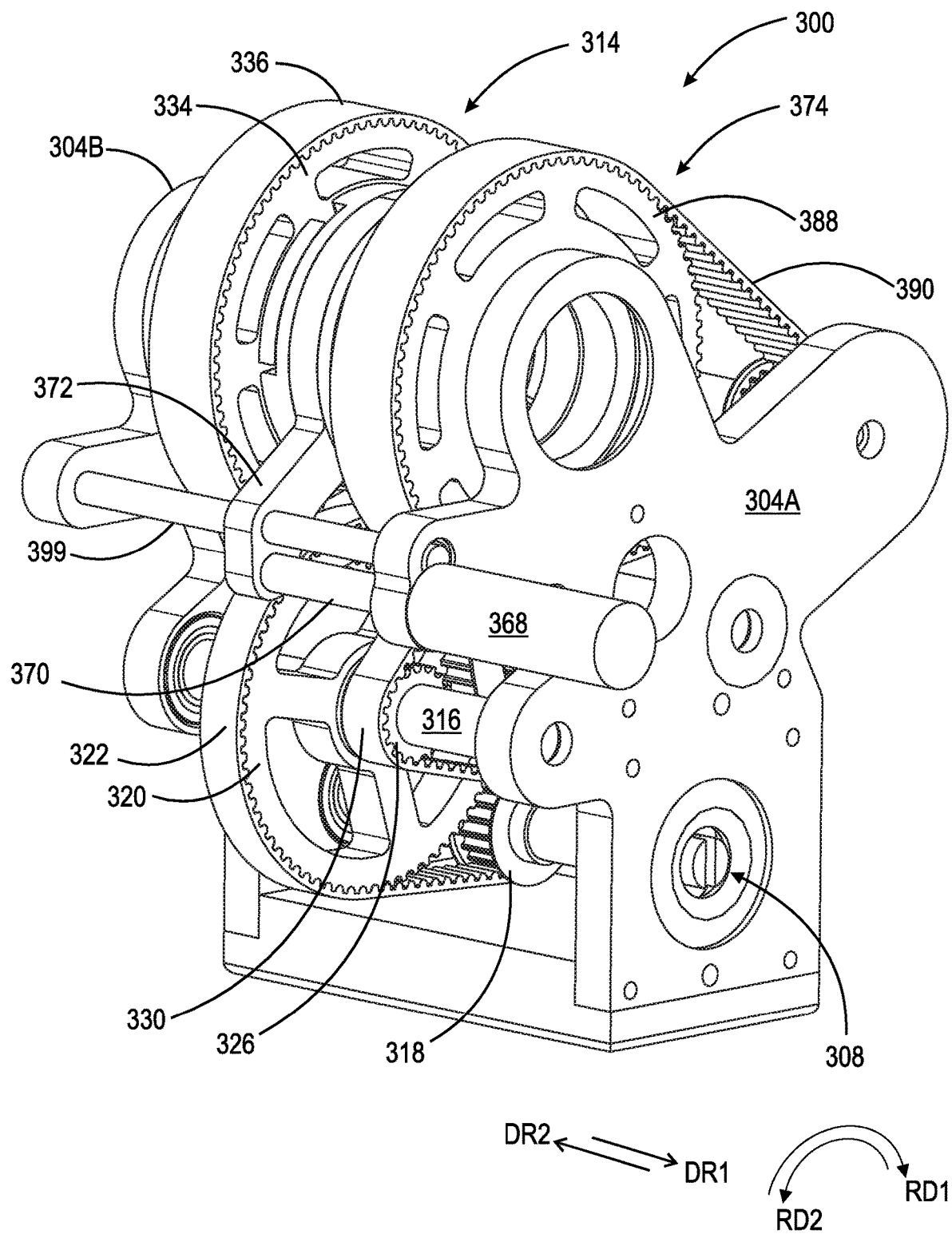
FIG. 13 is a front-left perspective view of a landing gear actuator assembly according to the present disclosure.
Figure 19:
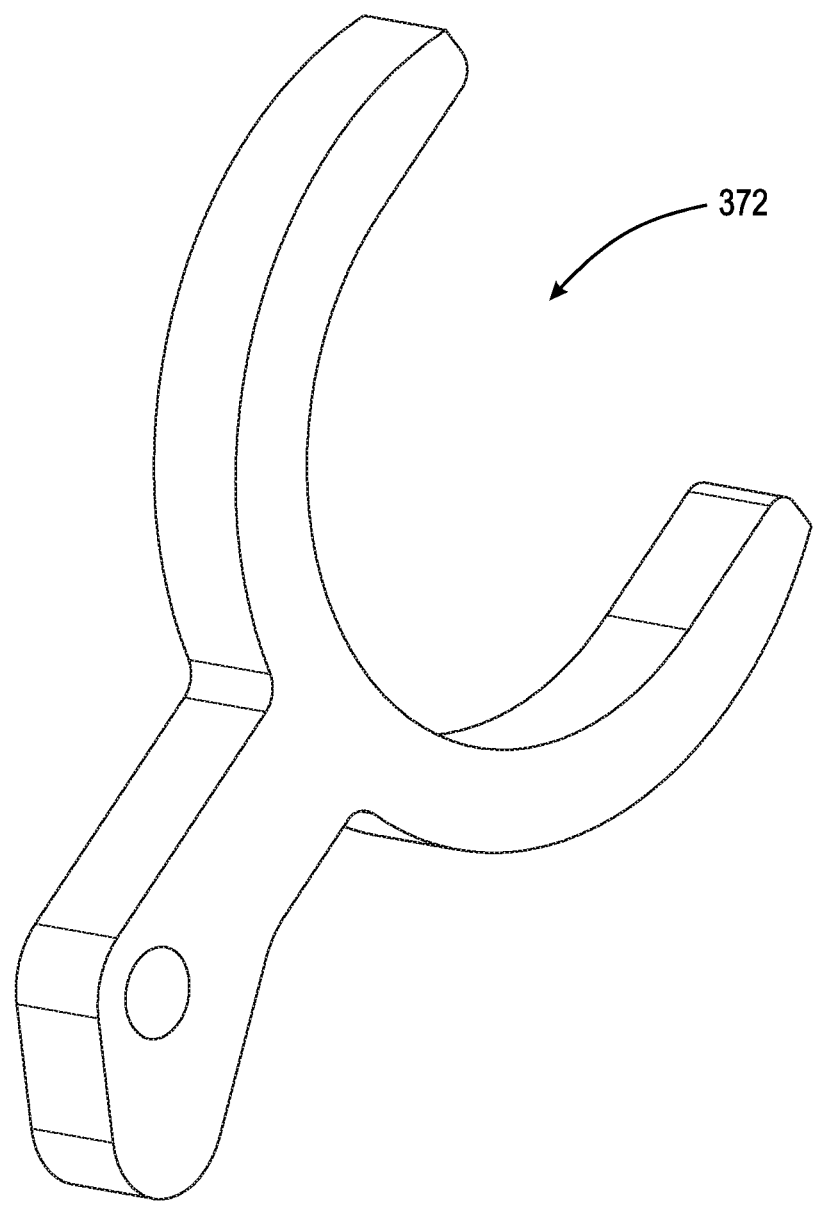
FIG. 19 is a front perspective view of a shift fork according to the present disclosure.

The following description of landing gear actuator assembly 300 includes similar description and functionality as described and illustrated above with respect to landing gear actuator assembly 200 with the addition of certain exemplary components or elements as will be illustrated with reference to FIGS. 11-19. FIGS. 11 and 12 illustrate left-side and ride-side exploded views of landing gear actuator assembly 300, respectively. FIGS. 13-17 illustrate various assembled views of landing gear actuator assembly 300. FIGS. 18A-18C illustrate various views of rotational engagement mechanism 344. FIG. 19 illustrates a perspective view of shift fork 372. Although not illustrated, it should be appreciated that landing gear actuator assembly 300 may include a cover or housing 302 (not shown), mounting plates 304A-304B, motor 306, and input shaft 308. Housing 302 (not shown) may be an enclosure arranged to at least partially enclose the various components associated with landing gear actuator assembly 300 as will be described below. Housing 302 (not shown) can be made from metals, e.g., aluminum or stamped steel, hardenable polymers, e.g., plastics such as High Density Polyethylene (HDPE) or Polyether Ether Ketone (PEEK), or any material of sufficient durability to withstand harsh environmental conditions and/or conditions conducive to corrosion experienced by vehicles, e.g., oils contained in road-spray, rust, salt exposure, etc. Mounting plates 304A-304B are arranged within housing 302 (not shown) and configured to support and organize the various rotating components of the first gear stage 310, second gear stage 312, the light gear set 314, the idle gear set 376, and the heavy gear set 374 (all discussed below in detail). It should be appreciated that mounting plates 304A-304B may be arranged to receive the shafts and gears discussed below directly or indirectly via a device that mitigates rotational friction, e.g., rotational bearings. It should also be appreciated that mounting plates 304A-304B may optionally be included with landing gear actuator assembly 300 and the shafts and gears discussed below may be arranged to connect directly or indirectly with respective portions of housing 302 (not shown) rather than mounting plates 304A-304B.

Motor 306 is arranged to receive a remote signal, e.g., corresponding to an input from an operator of a tractor (arranged to couple with a trailer having a trailer landing gear assembly 100), and provide a rotational motion having an initial motor torque IMT to input shaft 308. It should be appreciated that motor 306 can be any motor capable of generating rotational motion in response to a remote signal, e.g., an electric motor, a pneumatic motor, or a hydraulic motor. Input shaft 308 is arranged to receive the initial motor torque IMT from motor 306 and rotate in a first rotational direction RD1 (illustrated in FIGS. 11-12). It should be appreciated that input shaft 308 is configured to matingly engage with a plurality of bearings arranged on or in the mounting plates 304A and 304B, or, on or in housing 302 (not shown).

As mentioned above, landing gear actuator assembly 300 further includes multiple gear assemblies and at least one gear set configured to alter the initial motor torque IMT provided by motor 306 to input shaft 308 such that landing gear actuator assembly 300 can provide rotational motion to cross-shaft 106 of trailer landing gear assembly 100 at a higher torque than the initial motor torque IMT. In one example, landing gear actuator assembly 300 further includes a first gear stage 310, a second gear stage 312, and a light gear set 314 (also referred to as "first gear set 314"), and a heavy gear set 374 (also referred to as "second gear set 374".

First gear stage 310 is arranged between input shaft 308 and a first gear stage shaft 316. First gear stage 310 includes a first gear wheel 318 arranged to rotate about input shaft 308 and a second gear wheel 320 arranged to rotate about first gear stage shaft 316. First gear wheel 318 has a first radius RA1 and a first width W1 as well as an outer circumferential surface which includes a plurality of gear teeth. Second gear wheel 320 has a second radius RA2 where second radius RA2 is greater than first radius RA1. Second gear wheel 320 may also have a width corresponding to the width of the first gear wheel 318, i.e., first width W1, as well as an outer circumferential surface with a plurality of gear teeth.

As illustrated in FIGS. 13-17, first gear stage 310 further includes a first gear stage connector 322 arranged between first gear wheel 318 and second gear wheel 320 to transfer rotational motion and torque between both gears. It should be appreciated that first gear stage connector 322 may be any device capable of rotationally coupling first gear wheel 318 and second gear wheel 320. For example, first gear stage connector 322 may be a belt, ribbed belt, or chain. It should also be appreciated that first gear wheel 318 and second gear wheel 320 may be coupled directly, e.g., via the respective pluralities of teeth arranged on each gear wheel's outer circumferential surface. Additionally, it should be appreciated that first gear wheel 318 and second gear wheel 320 could also be coupled via additional gear arrangements or components, e.g., bevel gear arrangements. First gear stage 310 is arranged to reduce the initial motor speed and increase or step-up the initial motor torque IMT between input shaft 308 and first gear stage shaft 316. It should be appreciated that the ratio between first radius RA1 and second radius RA2 of first gear wheel 318 and second gear wheel 320 is proportional to the increase in torque output and inversely proportional to the speed transferred across the first gear stage 310. As is known in the art, these ratios may be utilized to determine a gear ratio across first gear stage 310. In one example, the gear ratio across first gear stage 310 is selected from a range of ratios between 1:2-1:5. In one example, the selected gear ratio across first gear stage 310 is 1:3.684.

Similarly, and for the purpose of further increasing the torque output of landing gear actuator assembly 300, landing gear actuator assembly 300 may optionally include a second gear stage 312. Second gear stage 312 is arranged between first gear stage shaft 316 and a second gear stage shaft 324. Second gear stage 312 includes a first gear wheel 326 arranged to rotate about first gear stage shaft 316 and a second gear wheel 328 arranged to rotate about second gear stage shaft 324. First gear wheel 326 has a first radius RA1 and a first width W1 as well as an outer circumferential surface which includes a plurality of gear teeth. Second gear wheel 328 has a second radius RA2 where second radius RA2 is greater than first radius RA1. Second gear wheel 328 may also have a width corresponding to the width of the first gear wheel 326, i.e., first width W1, as well as an outer circumferential surface with a plurality of gear teeth.

As illustrated in FIGS. 13-17, second gear stage 312 further includes a second gear stage connector 330 arranged between first gear wheel 326 and second gear wheel 328 to transfer rotational motion and torque between both gears. It should be appreciated that second gear stage connector 330 may be any device capable of rotationally coupling first gear wheel 326 and second gear wheel 328. For example, second gear stage connector 330 may be a belt, ribbed belt, or chain. It should also be appreciated that first gear wheel 326 and second gear wheel 328 may be coupled directly, e.g., via the respective pluralities of teeth arranged on each gear wheel's outer circumferential surface. Additionally, it should be appreciated that first gear wheel 326 and second gear wheel 328 could also be coupled via additional gear arrangements or components, e.g., bevel gear arrangements. Second gear stage 312 is arranged to reduce the speed and increase or step-up the torque between first gear stage shaft 316 and second gear stage shaft 324. It should be appreciated that the ratio between first radius RA1 and second radius RA2 of first gear wheel 326 and second gear wheel 328 is proportional to the increase in torque output and inversely proportional to the speed transferred across the second gear stage 312. As is known in the art, these ratios may be utilized to determine a gear ratio across second gear stage 312. In one example, the gear ratio across second gear stage 312 is selected from a range of ratios between 1:2-1:5. In one example, the selected gear ratio across second gear stage 312 is 1:3.684.

As discussed above, landing gear actuator assembly 300 further includes a light gear set 314 (also referred to as "first gear set 314"). Within landing gear actuator assembly 300, light gear set 314 is arranged to be selectably coupled to cross-shaft adaptor 362 (discussed below) such that rotational motion and/or torque can be selectably transferred from second gear stage 312 to cross-shaft 106. Light gear set 314 includes a first light gear wheel 332 arranged to rotate about second gear stage shaft 324 and a second light gear wheel 334 arranged to rotate about cross-shaft 106. First light gear wheel 332 has a first radius RA1 and a second width W2, where the second width W2 is greater than the first width W1. Additionally, first light gear wheel 332 includes an outer circumferential surface which includes a plurality of gear teeth. Second light gear wheel 334 has a second radius RA2 where second radius RA2 is greater than first radius RA1. Second gear wheel 334 also has a width corresponding to the width of the first light gear wheel 332, i.e., second width W2, as well as an outer circumferential surface with a plurality of gear teeth.

Figure 15:
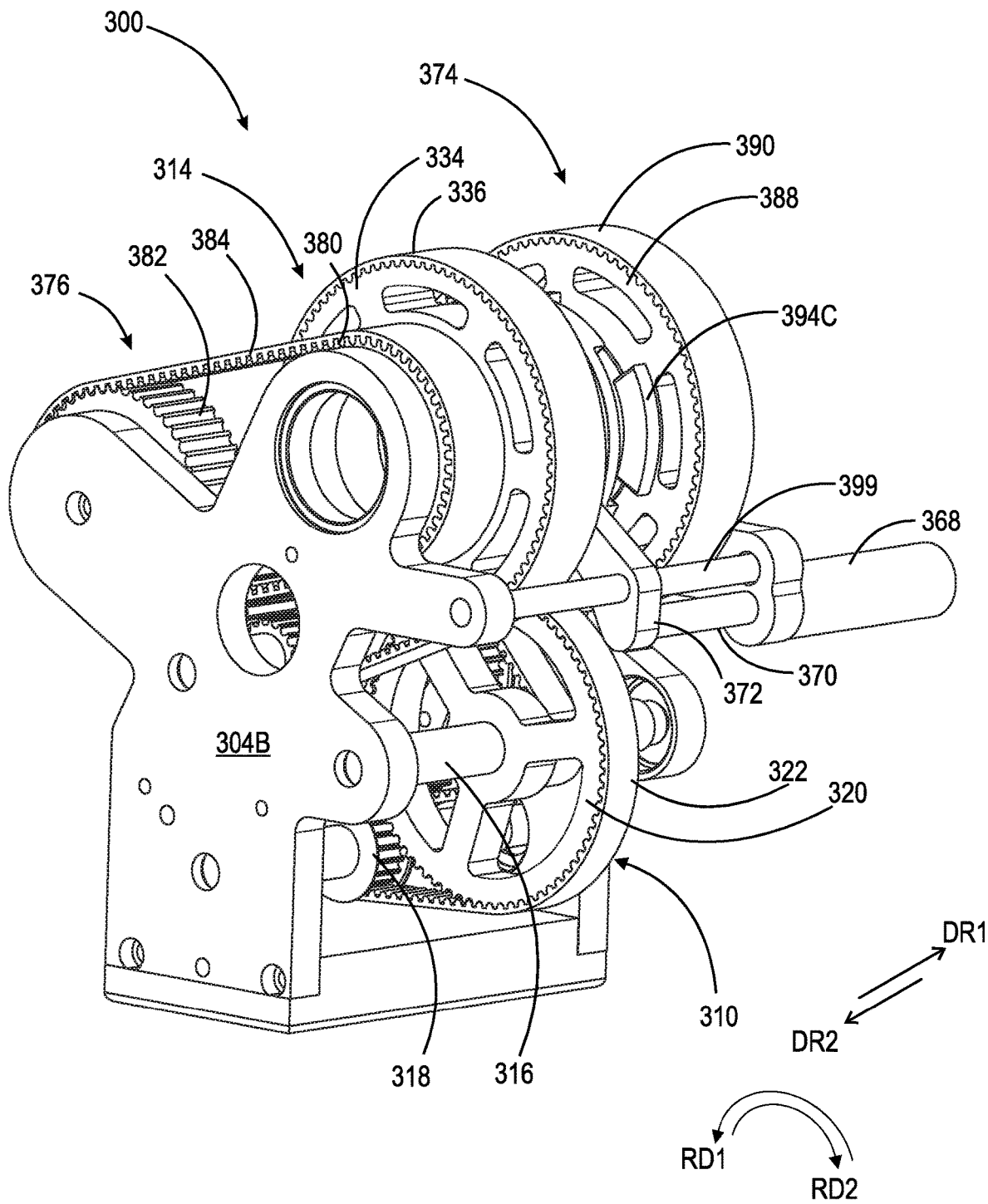
FIG. 15 is a rear-left perspective view of a landing gear actuator assembly according to the present disclosure.
Figure 16:
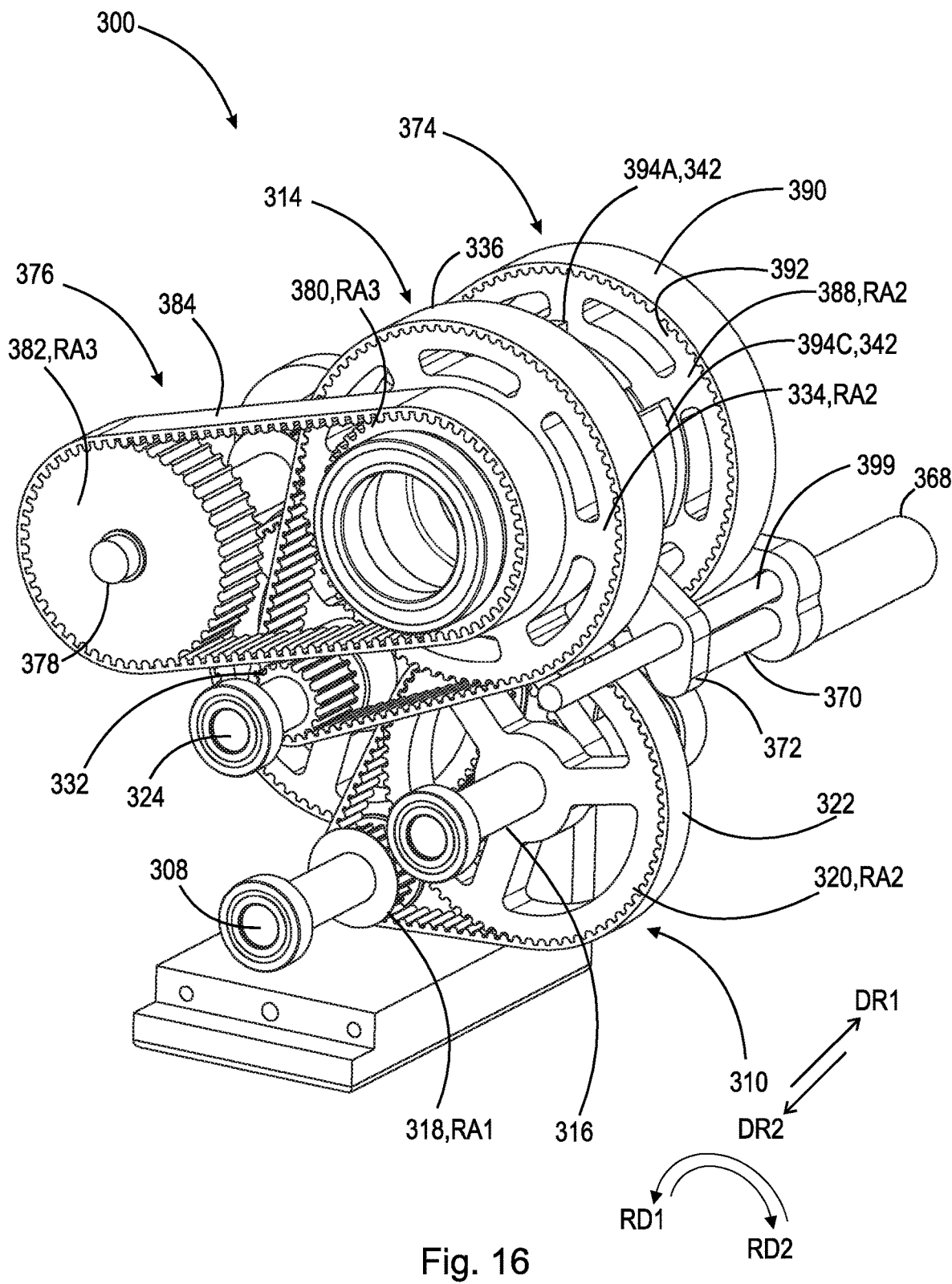
FIG. 16 is a rear-left perspective view of a landing gear actuator assembly with the rear mounting plate removed according to the present disclosure.
Figure 17:
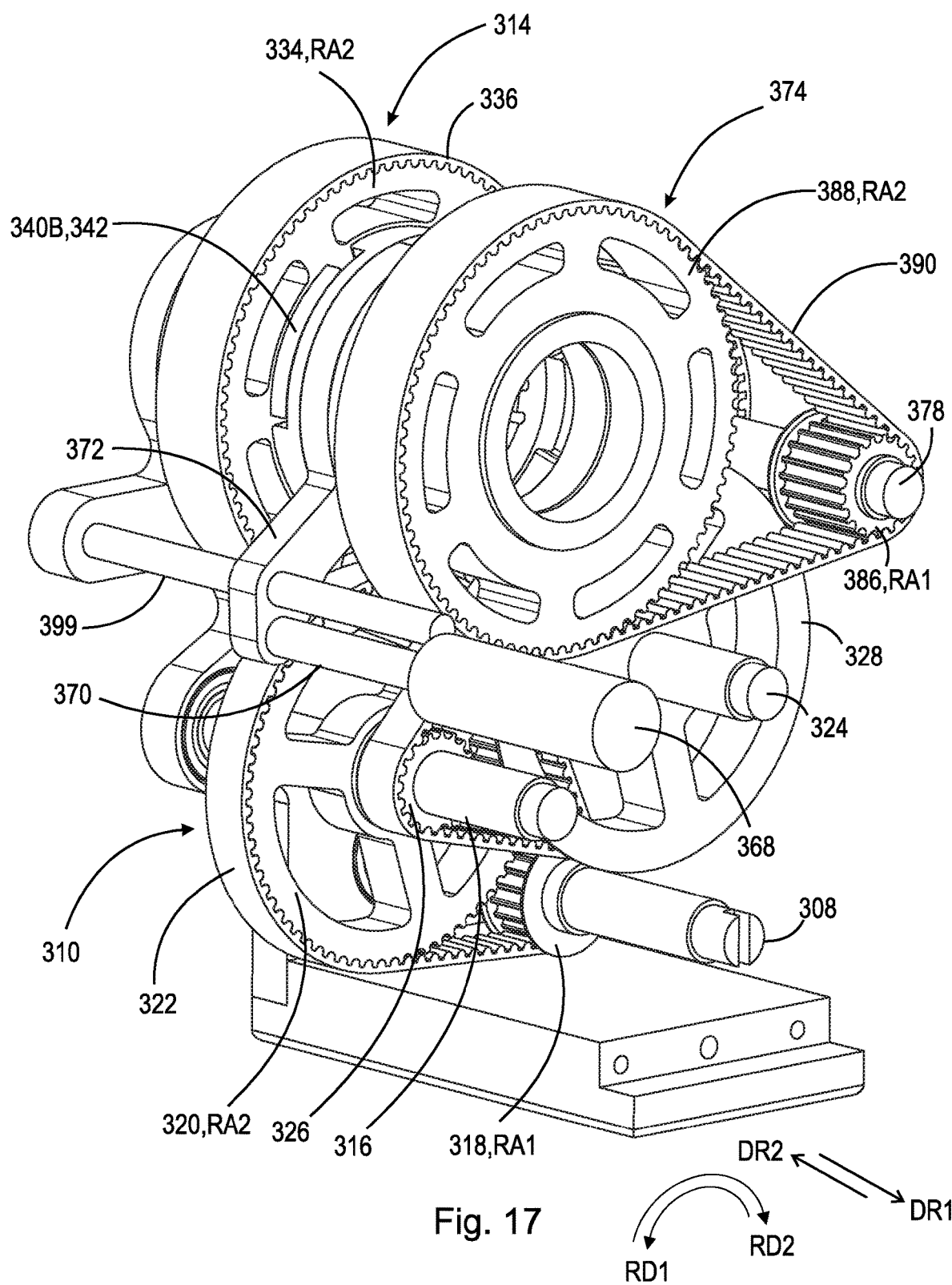
FIG. 17 is a front-left perspective view of a landing gear actuator assembly with the front mounting plate removed according to the present disclosure.

As illustrated in FIGS. 15-17, light gear set 314 further includes a light gear set connector 336 arranged between first light gear wheel 332 and second light gear wheel 334 to transfer rotational motion and torque between both gears. It should be appreciated that light gear set connector 336 may be any device capable of rotationally coupling first light gear wheel 332 and second light gear wheel 334. For example, light gear set connector 336 may be a belt, ribbed belt, or chain. It should also be appreciated that first light gear wheel 332 and second light gear wheel 334 may be coupled directly, e.g., via the respective pluralities of teeth arranged on each gear wheel's outer circumferential surface. Additionally, it should be appreciated that first light gear wheel 332 and second light gear wheel 334 could also be coupled via additional gear arrangements or components, e.g., bevel gear arrangements. Light gear set 314 is arranged to reduce the speed and increase or step-up the torque between second gear stage shaft 324 and cross-shaft 106 (as will be discussed below). It should be appreciated that the ratio between first radius RA1 and second radius RA2 of first light gear wheel 332 and second light gear wheel 334 is proportional to the increase in torque output and inversely proportional to the speed transferred across the light gear set 314. As is known in the art, these ratios may be utilized to determine a gear ratio across light gear set 314. In one example, the gear ratio across light gear set 314 is selected from a range of ratios between 1:2-1:6. In one example, the selected gear ratio across light gear set 314 is 1:4.444. In one example, the gear ratios discussed above, at least with respect to first gear stage 310 and second gear stage 312, increase the initial motor torque IMT significantly. Should light gear set connector 336 be a belt, which relies on frictional engagement, and therefore surface area, to prevent slipping, to increase the width of the respective gear wheels of light gear wheel set 314, operates to prevent slipping of the light gear set connector 336 when selectably coupled to cross-shaft adaptor 362 (discussed below).

Second light gear wheel 334 further includes a first side face 338. First side face 338 of second light gear wheel 334 includes a first surface, the first surface having a first plurality of protrusions 340A-340C extending therefrom. First plurality of protrusions 340A-340C extend away from the surface of first side face 338 in a direction parallel to the axis of rotation of cross-shaft 106, i.e., first direction DR1. In one example, each protrusion of plurality of protrusions 340A-340C is arranged about cross-shaft 106 and spaced equal radial distances from each other, i.e., each protrusion is arranged 120 degrees from each other about cross-shaft 106. Although three protrusions are shown, it should be appreciated that more protrusions or less protrusions, e.g., more than three or less than three, can be utilized. Additionally, it should be appreciated that each protrusion of plurality of protrusions has an outer edge corresponding to a first arc length 342.

Landing gear actuator assembly 300 further includes a heavy gear set 374 connected to second gear stage 312 via an idle gear set 376 and a transfer shaft 378 as will be described below. Idle gear set 376 includes a first idle gear wheel 380 arranged to rotate about cross-shaft 106 and a second idle gear wheel 382 arranged to rotate about transfer shaft 378. First idle gear wheel 380 has a third radius RA3 and a second width W2, where the second width W2 is greater than the first width W1 (discussed above). Additionally, first idle gear wheel 380 includes an outer circumferential surface which includes a plurality of gear teeth. Second idle gear wheel 382 has a third radius RA, e.g., a radius that is substantially equal to the radius of the first idle gear wheel 380. Second idle gear wheel 382 also has a width corresponding to the width of the first idle gear wheel 380, i.e., second width W2, as well as an outer circumferential surface with a plurality of gear teeth.

As illustrated in FIGS. 15-16, idle gear set 376 further includes a idle gear set connector 384 arranged between first idle gear wheel 380 and second idle gear wheel 382 to transfer rotational motion and torque between both gears. It should be appreciated that idle gear set connector 384 may be any device capable of rotationally coupling first idle gear wheel 380 and second idle gear wheel 382. For example, idle gear set connector 384 may be a belt, ribbed belt, or chain. It should also be appreciated that first idle gear wheel 380 and second idle gear wheel 382 may be coupled directly, e.g., via the respective pluralities of teeth arranged on each gear wheel's outer circumferential surface. Additionally, it should be appreciated that first idle gear wheel 380 and second idle gear wheel 382 could also be coupled via additional gear arrangements or components, e.g., bevel gear arrangements. Idle gear set 376 is arranged to maintain the speed and the torque between second gear stage shaft 324 and transfer shaft 378 (as will be discussed below). It should be appreciated that, although idle gear set 376 is not intended to alter the rotational motion provided by second gear stage 312, it should be appreciated that idle gear set 376 may be arranged to further increase or decrease the torque provided prior to providing rotation motion to transfer shaft 378.

As discussed above, landing gear actuator assembly 300 further includes a heavy gear set 374 (also referred to as "second gear set 374"). Within landing gear actuator assembly 300, heavy gear set 374 is arranged to be selectably coupled to cross-shaft adaptor 362 (discussed below) such that rotational motion and/or torque can be selectably transferred from heavy gear set 374 to cross-shaft 106. Heavy gear set 374 includes a first heavy gear wheel 386 arranged to rotate about transfer shaft 378 and a second heavy gear wheel 388 arranged to rotate about cross-shaft 106. First heavy gear wheel 386 has a first radius RA1 and a second width W2, where the second width W2 is greater than the first width W1. Additionally, first heavy gear wheel 386 includes an outer circumferential surface which includes a plurality of gear teeth. Second heavy gear wheel 388 has a second radius RA2 where second radius RA2 is greater than first radius RA1. Second heavy gear wheel 388 also has a width corresponding to the width of the first heavy gear wheel 386, i.e., second width W2, as well as an outer circumferential surface with a plurality of gear teeth.

As illustrated in FIGS. 13-17, heavy gear set 374 further includes a heavy gear set connector 390 arranged between first heavy gear wheel 386 and second heavy gear wheel 388 to transfer rotational motion and torque between both gears. It should be appreciated that heavy gear set connector 390 may be any device capable of rotationally coupling first heavy gear wheel 386 and second heavy gear wheel 388. For example, heavy gear set connector 390 may be a belt, ribbed belt, or chain. It should also be appreciated that first heavy gear wheel 386 and second heavy gear wheel 388 may be coupled directly, e.g., via the respective pluralities of teeth arranged on each gear wheel's outer circumferential surface. Additionally, it should be appreciated that first heavy gear wheel 386 and second heavy gear wheel 388 could also be coupled via additional gear arrangements or components, e.g., bevel gear arrangements. Heavy gear set 374 is arranged to reduce the speed and increase or step-up the torque between transfer shaft 378 and cross-shaft 106 (as will be discussed below). It should be appreciated that the ratio between first radius RA1 and second radius RA2 of first heavy gear wheel 386 and second heavy gear wheel 388 is proportional to the increase in torque output and inversely proportional to the speed transferred across the heavy gear set 314. As is known in the art, these ratios may be utilized to determine a gear ratio across heavy gear set 374. In one example, the gear ratio across heavy gear set 374 is selected from a range of ratios between 1:2-1:6. In one example, the selected gear ratio across heavy gear set 314 is 1:4.211. In one example, the gear ratios discussed above, at least with respect to first gear stage 310 and second gear stage 312, increase the initial motor torque IMT significantly. Should heavy gear set connector 390 be a belt, which relies on frictional engagement, and therefore surface area, to prevent slipping, to increase the width of the respective gear wheels of heavy gear set 374, operates to prevent slipping of the heavy gear set connector 390 when selectably coupled to cross-shaft adaptor 362 (discussed below).

Second heavy gear wheel 388 further includes a first side face 392. First side face 392 of second heavy gear wheel 388 includes a first surface, the first surface having a second plurality of protrusions 394A-394C extending therefrom. Second plurality of protrusions 394A-394C extend away from the surface of first side face 392 in a direction parallel to the axis of rotation of cross-shaft 106 and opposite the direction of extension of first plurality of protrusions 340A-340C of second light gear wheel 334, i.e., second direction DR2. In one example, each protrusion of plurality of protrusions 394A-394C is arranged about cross-shaft 106 and spaced equal radial distances from each other, i.e., each protrusion is arranged 120 degrees from each other about cross-shaft 106. Although three protrusions are shown, it should be appreciated that more protrusions or less protrusions, e.g., more than three or less than three, can be utilized. Additionally, it should be appreciated that each protrusion of plurality of protrusions has an outer edge corresponding to a first arc length 342 as discussed above.

Landing gear actuator assembly 300 further includes a rotational engagement mechanism 344. Rotational engagement mechanism 344 is arranged between second light gear wheel 334 of light gear set 314 and second heavy gear wheel 388 of heavy gear set 374. In one example, as illustrated in FIGS. 18A-18C, rotational engagement mechanism 344 is a dual-sided clutch plate arranged to selectably engage and selectably disengage with light gear set 314 as well as heavy gear set 374 (discussed above). Although described and illustrated as a dog-clutch-style clutch plate, it should be appreciated that any mechanism capable of selectably engaging or disengaging with light gear set 314 or heavy gear set 374 may be utilized, e.g., a friction clutch assembly, a fluid clutch assembly, a plurality of gears or shifting bevel gear arrangements, etc.

As illustrated in FIGS. 18A-18C, rotational engagement mechanism 344 includes a first side face 346, outer circumferential surface 348, and inner circumferential surface 350. First side face 346 of rotational engagement mechanism 344 includes a first surface, the first surface having a first plurality of recesses 352A-352C extending inward therefrom. First plurality of recesses 352A-352C extend inward from the first surface of first side face 346 in a direction parallel to the axis of rotation of cross-shaft 106, i.e., first direction DR1, and arranged to selectably receive respective protrusions of first plurality of protrusions 340A-340C discussed above. In one example, each recess of plurality of recesses 352A-352C is arranged about cross-shaft 106 and spaced equal radial distances from each other, i.e., each recess is arranged 120 degrees from each other about cross-shaft 106. Although three recesses are shown, it should be appreciated that more recesses or less recesses, e.g., more than three or less than three, can be utilized. Additionally, it should be appreciated that each recess of plurality of recesses 352A-352C has an outer edge corresponding to a second arc length 354, where the second arc length 354 is greater than first arc length 342 of each of the first plurality of protrusions 340A-340C. It should be appreciated that the increased area afforded by having first plurality of recesses 352A-352C having a greater arc length, i.e., second arc length 354, allows coupling between light gear set 314 and rotational engagement mechanism 344 while one or both components are rotating. The additional radial space provided by the larger second arc length allows for a smoother coupling between light gear set 314 and rotational engagement mechanism 344.

Rotational engagement mechanism 344 further includes a second side face 396. Second side face 396 of rotational engagement mechanism 344 includes a second surface, the second surface having a second plurality of recesses 398A-398C extending inward therefrom. Second plurality of recesses 398A-398C extend inward from the second surface of second side face 396 in a direction parallel to the axis of rotation of cross-shaft 106 and in the opposite direction as first plurality of recesses 352A-352C of first side face 346, i.e., second direction DR2, and are arranged to selectably receive respective protrusions of second plurality of protrusions 394A-394C discussed above. In one example, each recess of second plurality of recesses 398A-398C is arranged about cross-shaft 106 and spaced equal radial distances from each other, i.e., each recess is arranged 120 degrees from each other about cross-shaft 106. Although three recesses are shown, it should be appreciated that more recesses or less recesses, e.g., more than three or less than three, can be utilized. Additionally, it should be appreciated that each recess of plurality of recesses 398A-398C has an outer edge corresponding to a second arc length 354, where the second arc length 354 is greater than first arc length 342 of each of the second plurality of protrusions 394A-394C. It should be appreciated that the increased area afforded by having second plurality of recesses 398A-398C having a greater arc length, i.e., second arc length 354, allows coupling between heavy gear set 374 and rotational engagement mechanism 344 while one or both components are rotating. The additional radial space provided by the larger second arc length allows for a smoother coupling between heavy gear set 374 and rotational engagement mechanism 344.

Rotational engagement mechanism 344 further includes outer circumferential surface 348. Outer circumferential surface 348 includes an annular recess 356. Annular recess 356 is arranged to receive at least a portion of shift fork 372 (discussed below). Furthermore, rotational engagement mechanism 344 also includes inner circumferential surface 350 which includes a plurality of splines 358 arranged to engage with cross-shaft adaptor 362 (discussed below). Plurality of splines 358 of rotational engagement mechanism are arranged to receive the rotational motion and torque selectably provided to the rotational engagement mechanism, e.g., by light gear set 314, and transfer that rotational motion or torque to complementary recesses (e.g., plurality of recesses 366) of cross-shaft adaptor 362 (discussed below) Each spline protrusion includes at least one radius relief cut 360. It should be appreciated that more than one radius relief cut 360 may be provided adjacent each spline protrusion of plurality of splines 358. For example, as illustrated in FIG. 18C, two radius relief cuts 360A and 360B are provided. Radius relief cuts 360A and 360B are arranged to expose more surface area on the sides of each spline protrusion to increase contact and ensure torque transfer between each spline of plurality of splines 358 and the respective recesses of cross-shaft adaptor 362.

Landing gear actuator assembly 300 further includes cross-shaft adaptor 362 arranged to be secured to cross-shaft 106 of trailer landing gear assembly 100 as illustrated in FIG. 1. It should be appreciated that cross-shaft adaptor 362 can be coupled to cross-shaft 106 in a variety of ways, e.g., may be integral to cross-shaft 106 or may be removably secured by at least one fastener, e.g., a bolt and nut arrangement. Cross-shaft adaptor 362 has an outer circumferential surface 364 with a plurality of recesses 366 arranged thereon. As described above, plurality of recesses 366 are arranged to receive respective splines of plurality of splines 358 to receive rotational motion and/or torque transferred by, for example, light gear set 314.

Figure 14:
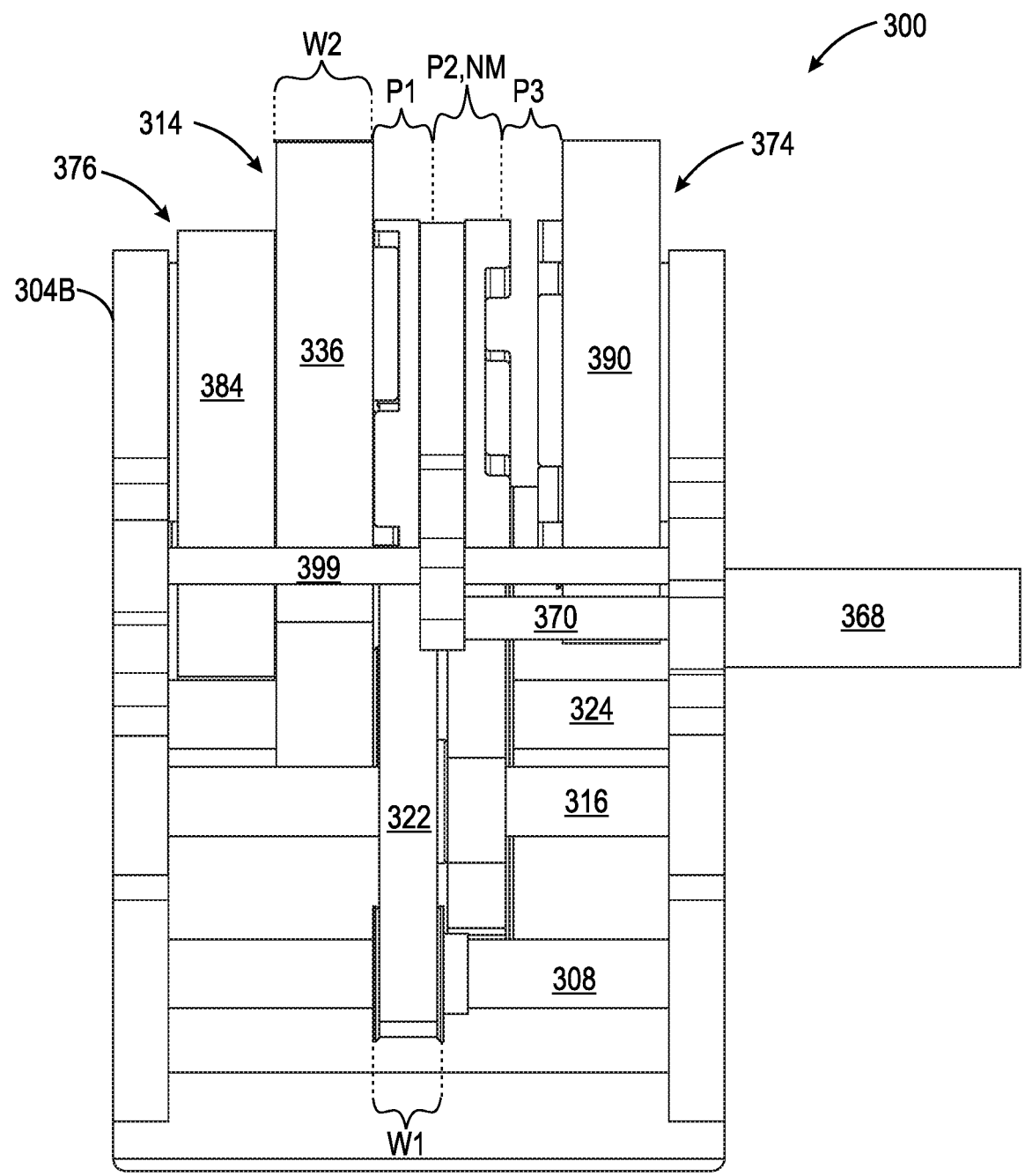
FIG. 14 is a left-side elevational view of a landing gear actuator assembly according to the present disclosure.

As illustrated in at least FIGS. 13-17, landing gear actuator assembly 300 also includes an actuator 368 having an actuator arm 370 securely connected to a shift fork 372. Actuator 368 is arranged to receive a remote signal, e.g., corresponding to an input from an operator of a tractor (arranged to couple with a trailer having a trailer landing gear assembly 100), and provide translational motion of arm 370. It should be appreciated that actuator 368 can be any actuator capable of generating translational motion in response to a remote signal, e.g., an electric actuator (e.g., an electromechanical actuator), a pneumatic actuator, or a hydraulic actuator. Shift fork 372 has a lower portion and a forked portion (as illustrated in FIG. 19). The lower portion is arranged to be fixedly secured to arm 370 of actuator 368, and the forked portion is arranged to slidingly engage with at least a portion of annular recess 356. This sliding engagement within annular recess 356 allows rotational engagement mechanism 344 to rotate about cross-shaft 106 while maintaining axial engagement with the forked portion of shift fork 372. Although rotational engagement mechanism 344 is allowed to freely rotate while engaged with the forked portion of shift fork 372, shift fork 372 may still impart axial force, i.e., a force in the first direction DR1 or the second direction DR2 to operably shift rotational engagement mechanism 344 from a first position P1 to a second position P2, where first position P1 is associated with an engagement between first plurality of protrusions 340A-340C of second light gear wheel 334 of light gear set 314 and first plurality of recess 352A-352C of rotational engagement mechanism 344, and the second position P2 is associated with a neutral mode NM, where there is no contact or engagement between first plurality of protrusions 340A-340C of second light gear wheel 334 and first plurality of recess 352A-352C of rotational engagement mechanism 344, nor is there any contact or engagement between second plurality of protrusions 394A-394C of second heavy gear wheel 388. Furthermore, shift fork 372 and actuator 368 may also operably shift rotational engagement mechanism 344 in first direction DR1 from second position P2 to a third position P3, were third position P3 is associated with contact or engagement between second plurality of protrusions 394A-394C of second heavy gear wheel 388 and second plurality of recesses 398A-398C of rotational engagement mechanism 344. These positions will be described below with reference to the operation of landing gear actuator assembly 300. Additionally, as illustrated in FIG. 14, actuator 368 may translate or slidingly engage with a support shaft 399, arranged parallel to cross-shaft 106 to provide further support and prevent shift fork 372 from twisting or tilting as it progresses from, e.g., first position P1 to second position P2, or from second position P2 to third position P3. It should be appreciated that, although not illustrated, actuator 368 may include one or more biasing elements, e.g., a spring, arranged to mechanically bias actuator 368, arm 370, and shift fork 372 such that when no force is applied in response to any of the signals discussed above or below, the resting position of those components is second position P2 associated with a neutral mode NM. As discussed below, a further or additional signal may be provided by an operator of the tractor, to provide mechanical force against these exemplary biasing elements to shift rotational engagement mechanism 344 from second position P2 to first position P1 or third position P3.

During operation of landing gear actuator assembly 300, a signal is provided to motor 306 connected to input shaft 308 which operates to generate an initial rotational motion in first rotational direction RD1 with an initial motor torque IMT of input shaft 308. The initial motor torque IMT is increased through first gear stage 310 at a gear ratio of 1:3.684. Optionally, the torque is increased again through a second gear stage 312 at a gear ratio of 1:3.684. Once provided to light gear set 314, the torque is increased a third time between first light gear wheel 332 and second light gear wheel 334 such that the gear ratio between input shaft 308 and second light gear wheel 334 of light gear set 314 is 1:64. Additionally, once provided to second light gear wheel 334, torque is then transferred from second light gear wheel 334 to idle gear set 376 and across transfer shaft 378 to heavy gear set 374 where the torque is increased or stepped-up a fourth time. The foregoing arrangement illustrates that once initial motor torque IMT is provided to input shaft 308, both light gear set 314 and heavy gear set 374 are arranged to rotate and provide an output torque, where the torque of heavy gear set 374 is greater than the output torque of light gear set 314. The operator of the tractor may further provide an additional signal to actuator 368, which responsively provides translational motion of arm 370 and rotational engagement mechanism 344 from either: (i) second position P2 in a neutral mode NM to first position P1 such that first plurality of recess 352A-352C engage with and receive rotational motion and torque from first plurality of protrusions 340A-340C of light gear set 314, respectively; or (ii) from second position P2 in a neutral mode NM, to third position P3 such that second plurality of recesses 398A-398C of rotational engagement mechanism 344 engage with an receive rotational motion and torque from second plurality of protrusions 394A-394C of heavy gear set 374. It should be appreciated that the gear ratios of each gear stage can be adjusted so that the overall gear ratio between input shaft 308 and second light gear wheel 334 of light gear set 314 can range between 1:30-1:90 when in first position P1, and the overall gear ratio between input shaft 308 and second heavy gear wheel 388 of heavy gear set 374 can range between 1:220-1:270.

In first position P1, rotational motion and torque is transferred from light gear set 314 through first plurality of protrusions 340A-340C, to first plurality of recesses 352A-352C of rotational engagement mechanism 344. Similarly, in third position P3, rotational motion and torque is transferred from heavy gear set 374 through second plurality of protrusions 394A-394C, to second plurality of recesses 398A-398C of rotational engagement mechanism 344. Rotational engagement mechanism 344 may then provide the rotation and torque from light gear set 314 or heavy gear set 374 to cross-shaft adaptor 362 via plurality of splines 358 on inner circumferential surface 350 of rotational engagement mechanism 344. The interaction between plurality of splines 358 and the plurality of recesses 366 on cross-shaft adaptor 362 provide the rotational motion and torque to cross-shaft 106. This rotational motion and torque to cross-shaft 106 may be utilized by trailer landing gear assembly 100 to raise or lower the respective leg assemblies 102 and 104 (shown in FIGS. 2A-2B), to switch trailer landing gear assembly 100 between a retracted state and expanded state or vice versa. Should the operator of landing gear actuator assembly 300 wish to stop raising or lowering the respective leg assemblies, a further signal can be sent to actuator 368 which operates to translate arm 370, shift fork 372, and rotational engagement mechanism 344 from first position P1 or third position P3 back to second position P2 associated with a neutral mode NM where there is no engagement between light gear set 314 or heavy gear set 374 and rotational engagement mechanism 344. In this position, i.e., second position P2, the inherent frictional forces of the gears of the respective leg assemblies will maintain the current position of the legs with respect to the ground beneath the trailer and motor 306 may be shut down or shut off. It should be appreciated that the reverse is possible, e.g., the initial rotational motion of motor 306 can be in second rotational direction RD2, opposite first rotational direction RD1. In this mode, the same selectable engagement described above may be performed to induce opposite motion on the leg assemblies as initially provided. In other words, if initial motion of motor 306 in first rotational direction DR1 operates to raise the respective leg assemblies, initial motion of motor 306 in second rotational direction DR2 may operate to lower the respective leg assemblies using the same mechanisms and components described above.

Advantageously, should any aspect or component of the foregoing landing gear actuator assembly fail, rotational engagement mechanism (244,344) will default to second position P2, i.e., in a neutral mode NM (due to the rest position generated by the biasing members within the actuator (268,368) and the operator can utilize the external manual hand crank, i.e., hand crank 122 to manually rotate cross-shaft 106 to transition the landing gear assembly 100 from the retracted state to the expanded state or vice versa. Moreover, given that rotational engagement mechanism 344 may be selectably coupled to either light gear set 314 or heavy gear set 374, the operate may chose, based on the particular situation, whether to raise or lower the landing gear assemblies while connected to the light gear set 314 (which runs faster with less torque output) or connected to the heavy gear set 374 (which runs slower with higher torque output). For example, should the respective leg assemblies discussed above contact the ground and the operator wishes to lift the weight of the trailer using only the landing gear actuator assembly 300, the operate may send a signal to actuator 368 to shift rotational engagement mechanism 344 to third position P3 to provide a greater torque output through cross-shaft adaptor 362. Alternatively, during the transition between the expanded state and the retracted state, the operator may desire faster retraction of the respective legs of the trailer landing gear assembly 100. In this alternative scenario, the operator may send a signal to actuator 368 to shift rotational engagement mechanisms 344 to first position P1 to provide less torque at a greater rotational speed. Additionally, the gear ratios for each stage and gear set are selected so that the landing gear legs of trailer landing gear assembly 100 may expand or retract completely in less than one minute.

Some additional advantages of the foregoing system include the ability to remotely, i.e., via pneumatic air supply systems, control or actuate the legs of a landing gear system quickly, i.e., faster than traditional methods, e.g., strictly with the use of a hand crank. Moreover, the ability to sense using first sensor 124 and/or second sensor 126 the distance travelled for first leg 110 and second leg 116 allows for complete automation of the landing gear between states. Furthermore, by removing the need for manual operation, risk of injury to the operator of the tractor is reduced if not completely eliminated.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

What is claimed is:

1. A landing gear actuator assembly, comprising:
   an input shaft arranged to receive rotational motion generated by a motor;
   a cross-shaft adaptor arranged to couple the landing gear actuator assembly to a cross-shaft of a trailer landing gear assembly;
   a light gear set associated with a first torque output of the landing gear actuator assembly, the light gear set comprising a light gear wheel having a first width;
   a heavy gear set associated with a second torque output of the landing gear actuator assembly, the second torque output greater than the first torque output;
   a first gear stage connected to the light gear set and the heavy gear set, the first gear stage arranged to increase an initial motor torque of the motor, the first gear stage comprising a light gear wheel having a second width, wherein the first width is greater than the second width; and,
   a rotational engagement mechanism arranged to selectably couple the rotational motion of the input shaft to the light gear set and selectably couple the rotational motion of the input shaft to the heavy gear set to rotate the cross-shaft adaptor using the light gear set or the heavy gear set.

2. The landing gear actuator assembly of claim 1, wherein the rotational engagement mechanism is a clutch plate having a first side face and a second side face, where the first side face of the clutch plate is arranged to engage with the light gear set and the second side face of the clutch plate is arranged to engage with the heavy gear set.

3. The landing gear actuator assembly of claim 2, wherein the first side face of the clutch plate further comprises a first plurality of recesses annularly spaced about and positioned adjacent to a circumferential surface of the clutch plate.

4. The landing gear actuator assembly of claim 3, wherein the light gear wheel comprises a first side face, the first side face of the light gear wheel comprising a first plurality of protrusions arranged to selectably engage with respective recesses of the first plurality of recesses of the first side face of the clutch plate.

5. The landing gear actuator assembly of claim 4, wherein each recess of the first plurality of recesses comprises a first arc length along the circumferential surface of the clutch plate, and each protrusion of the first plurality of protrusions of the first side face of the light gear wheel comprises a second arc length, where the second arc length is less than the first arc length.

6. The landing gear actuator assembly of claim 2, wherein the second side face of the clutch plate comprises a second plurality of recesses annularly spaced about and positioned adjacent to a circumferential surface of the clutch plate.

7. The landing gear actuator assembly of claim 6, wherein the heavy gear set includes a heavy gear wheel, the heavy gear wheel comprising a first side face, the first side face of the heavy gear wheel comprising a second plurality of protrusions arranged to selectably engage with respective recesses of the second plurality of recesses of the second side face of the clutch plate.

8. The landing gear actuator assembly of claim 1, wherein the rotational engagement mechanism is arranged to translate between a first position, a second position, and a third position, wherein the first position is associated with a transfer of the first torque output from the light gear set to the rotational engagement mechanism, the second position is associated with a neutral mode, and the third position is associated with a transfer of the second torque output from the heavy gear set to the rotational engagement mechanism.

9. The landing gear actuator assembly of claim 1, wherein the rotational engagement mechanism is connected to an actuator, wherein the actuator is a pneumatic actuator, an electric actuator, or a hydraulic actuator.

10. The landing gear actuator assembly of claim 9, wherein the rotational engagement mechanism is connected to the actuator via a shift fork.

11. The landing gear actuator assembly of claim 10, wherein the rotational engagement mechanism further comprises a circumferential surface comprising an annular recess, the annular recess arranged to receive the shift fork.

12. The landing gear actuator assembly of claim 1, wherein the light gear set comprises a first light gear wheel and a second light gear wheel rotationally coupled via a belt, chain, or gear teeth arrangement.

13. The landing gear actuator assembly of claim 1, wherein the rotational engagement mechanism has an inner circumferential surface, the inner circumferential surface including a plurality of splines arranged to non-rotatably engage with the cross-shaft adaptor.

\* \* \* \* \*